US011238258B2

(12) United States Patent
Lu et al.

(10) Patent No.: US 11,238,258 B2
(45) Date of Patent: *Feb. 1, 2022

(54) MUT FINGERPRINT ID SYSTEM

(71) Applicant: The Regents Of The University Of California, Oakland, CA (US)

(72) Inventors: Yipeng Lu, Davis, CA (US); David Horsley, Albany, CA (US); Hao-Yen Tang, San Jose, CA (US); Bernhard Boser, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/554,053

(22) Filed: Aug. 28, 2019

(65) Prior Publication Data

US 2020/0167538 A1 May 28, 2020

Related U.S. Application Data

(63) Continuation of application No. 14/896,150, filed as application No. PCT/US2014/046557 on Jul. 14, 2014, now Pat. No. 10,430,631.

(60) Provisional application No. 61/846,925, filed on Jul. 16, 2013.

(51) Int. Cl.
*G06K 9/00* (2006.01)
(52) U.S. Cl.
CPC ................. *G06K 9/0002* (2013.01)
(58) Field of Classification Search
CPC .................................................. G06K 9/0002
See application file for complete search history.

(56) References Cited

U.S. PATENT DOCUMENTS

| 5,224,174 A * | 6/1993 | Schneider ........... G01S 7/52061 |
| | | 382/124 |
| 5,515,738 A | 5/1996 | Tamori |
| 5,647,364 A | 7/1997 | Schneider et al. |
| 6,812,621 B2 | 11/2004 | Scott |
| 8,508,103 B2 | 8/2013 | Schmitt |
| 2004/0183652 A1 | 9/2004 | Deng et al. |
| 2005/0105784 A1 | 5/2005 | Nam |

(Continued)

FOREIGN PATENT DOCUMENTS

| JP | H 11500033 | 1/1999 |
| JP | 2005/110934 | 4/2005 |

(Continued)

OTHER PUBLICATIONS

Brown et al., (2004) "Design and Fabrication of Annular Arrays for High-Frequency Ultrasound", Ferroelectrics and Frequency Control IEEE 51(8):1010-1017.

(Continued)

*Primary Examiner* — Edward F Urban
*Assistant Examiner* — Wassim Mahrouka
(74) *Attorney, Agent, or Firm* — Bret E. Field; Rudy J. Ng; Bozicevic, Field & Francis LLP

(57) ABSTRACT

MEMS ultrasound fingerprint ID systems are provided. Aspects of the systems include the capability of detecting both epidermis and dermis fingerprint patterns in three dimensions. Also provided are methods of making and using the systems, as well as devices that include the systems.

14 Claims, 12 Drawing Sheets

(56) References Cited

U.S. PATENT DOCUMENTS

| | | | |
|---|---|---|---|
| 2005/0174015 A1* | 8/2005 | Scott | G06K 9/0002 |
| | | | 310/334 |
| 2006/0238077 A1 | 10/2006 | Scott | |
| 2007/0230754 A1 | 10/2007 | Jain et al. | |
| 2007/0272020 A1 | 11/2007 | Schneider et al. | |
| 2008/0258580 A1 | 10/2008 | Schneider et al. | |
| 2009/0289908 A1* | 11/2009 | Chen | G06F 1/3262 |
| | | | 345/173 |
| 2010/0251824 A1 | 10/2010 | Schneider et al. | |
| 2010/0256498 A1 | 10/2010 | Tanaka | |
| 2011/0285244 A1 | 11/2011 | Lewis et al. | |
| 2012/0320368 A1* | 12/2012 | Jiao | G01N 29/0681 |
| | | | 356/72 |
| 2013/0127592 A1 | 5/2013 | Fyke et al. | |

FOREIGN PATENT DOCUMENTS

| | | |
|---|---|---|
| JP | 2005/144186 | 6/2005 |
| JP | 2008/527681 | 7/2008 |
| JP | 2012/204874 | 10/2012 |

OTHER PUBLICATIONS

Dempster (2012) "High Frequency Piezoelctric Micromachined Ultrasound Transducers", Master Thesis at the University of Cal Davis pp. 1-55.

Fesenko (2012) "Capacitive Micromachined Ultrasonic Transducer (cMUT) for Biometric Applications Thesis for the Degree of Erasmus Mundus Master of Nanoscience and Nanotechnology", Master Thesis at the University of Goteborg, Sweden pp. 1-46.

Iula et al., (2011) "Capacitive Micro-Fabricated Ultrasonic Transducers for Biometric Applications", Microelectronic Engineering, 8(8):2278-2280.

Lamberti et al., (2011) "A High Frequency cMUT Probe for Ultrasound Imaging of Fingerprints", Sensors and Actuators A: Physical Elsevior BV NL pp. 561-569.

Savoia et al., (2010) "Design and Fabrication of a cMUT Probe for Ultrasound Imaging of Fingerprints", 2010 IEEE International Ultrasonics Symposium Proceedings pp. 1887-1880.

* cited by examiner

MUT FINGERPRINT ID SYSTEM

CROSS-REFERENCE TO RELATED APPLICATIONS

This application is a continuation of U.S. patent application Ser. No. 14/896,150 filed Dec. 4, 2015, issued as U.S. Pat. No. 10,430,631, which is a U.S. national stage entry of International Application No. PCT/US2014/046557, filed Jul. 14, 2014, which claims priority pursuant to 35 U.S.C. § 119 (e) to the filing date of the U.S. Provisional Patent Application Ser. No. 61/846,925, filed Jul. 16, 2013; the disclosures of each of which are herein incorporated by reference.

INTRODUCTION

Two dimensional fingerprint analysis has been used for centuries for personal identification in criminal justice cases. More recently, the applications for fingerprint identification have been extended to use in the broader commercial sphere, and have been effectively deployed in niche applications, such as security-critical applications such as banking.

However, automated optical fingerprint scanning techniques have a number of limitations that block their use in broader applications. For example, automated optical fingerprint scanning techniques sense only the epidermal layer of a fingerprint. As a result, they are prone to errors created by finger contamination.

The marketplace has reflected the limitations of optical fingerprint identification features for broad market needs, such as personal electronic devices. While initially provided as features for identification in many personal electronic devices, optical fingerprint scanners have been removed from most later models due to these limitations. They lacked the necessary robustness to perform predictably in such everyday environments.

Ultrasonic fingerprint scanners have been developed in an effort to minimize the limitations of currently available automated optical fingerprint scanning, and avoid some of the resulting errors, by analyzing the dermal fingerprint. For example, such a system is described by Schneider, et al. U.S. Pat. No. 5,224,174 issued Jun. 29, 1993. However, currently available ultrasonic fingerprint scanners devices are limited in their applications because of large size, the requirement of a physically moving scanning device, and cost.

Recently, initial experimental work has been conducted on the development of micromachined ultrasonic transducers (MUTs). This research includes capacitive micromachined ultrasonic transducers (CMUTs), such as that described at the website produced by placing "http://" before and ".pdf" after "publications.lib.chalmers.se/records/fulltext/166084" (Chalmers University of Technology, Göteborg, Sweden, 2012); and University of Salerno, Italy, 2011 further described at the website produced by placing "http://www." before "sciencedirect.com/science/article/pii/S0924424711005528". In an additional line of research, piezoelectric micromachined ultrasonic transducers (PMUTs) have been investigated at the University of California, Davis (Thesis, Christine Dempster January, 2013 as further described at the website produced by placing "http://" before and ".html" after "gradworks.umi.com/15/30/1530021".)

It would be a transformative advancement in fingerprint identification (fingerprint ID) if micromachined ultrasonic transducers (MUTs), such as capacitive micromachined ultrasonic transducers (CMUTs) and piezoelectric micromachined ultrasonic transducers (PMUTs) could be utilized to accomplish three dimensional fingerprint ID.

SUMMARY

The micromachined ultrasonic transducer fingerprint identification system (MUT fingerprint ID system) of the present invention is a revolutionary advancement in the field of personal authentication. The unprecedented small size, robust solid-state construction, and orders of magnitude lower cost per unit than current systems opens a new era in personal identification capabilities, with transformational impact on personal electronic devices, many other consumer goods, and entry enablement devices.

The MUT fingerprint ID system is a novel fingerprint sensor based on an array of ultrasonic transducers. Compared with existing ultrasonic fingerprint sensors based on bulk piezoelectric material, the MUT fingerprint ID system has advantages of a small size, easy fabrication, easy integration with electronics, and fast electronic scanning. These features represent a game-changing advancement over currently available bulky, failure prone mechanical scanners. This novel ultrasonic fingerprint sensor avoids the mechanical scanning needed by earlier ultrasonic fingerprint sensors.

Conventional fingerprint sensors used in consumer electronics applications are capacitive sensors and are extremely prone to errors due to wet, dry or oily fingers. Optical sensors are sensitive to dirt on fingers. Unlike both capacitive and optical sensors, which measure the fingerprint on the epidermis (skin surface), the ultrasonic sensor at the core of the MUT fingerprint ID system can detect the fingerprint on both the epidermis and dermis (subcutaneous) layers.

Since both dermis and epidermis detection are used by MUT fingerprint ID system to obtain the correct fingerprint pattern, the sensor is insensitive to both contamination and moist conditions of fingers. By contrast, optical and capacitive sensors are sensitive to contamination. The MUT fingerprint ID system is able to electronically scan the focused acoustic beam over a large distance (from several mm to several cm) with small step size (~50 μm).

Ultrasonic fingerprint sensors have high fidelity and are used in security-critical applications such as banking. However, existing ultrasonic sensors use a single bulk ultrasound transducer that is mechanically scanned, making these sensors too large, slow, and expensive for use in consumer electronics (e.g. laptops and smartphones).

The novel MUT fingerprint ID system is provided with a micromachined ultrasonic transducer array and a new electronic scanning method that is digital, has a fast response, and can work in a live scan mode.

DETAILED DESCRIPTION

Figure 1:
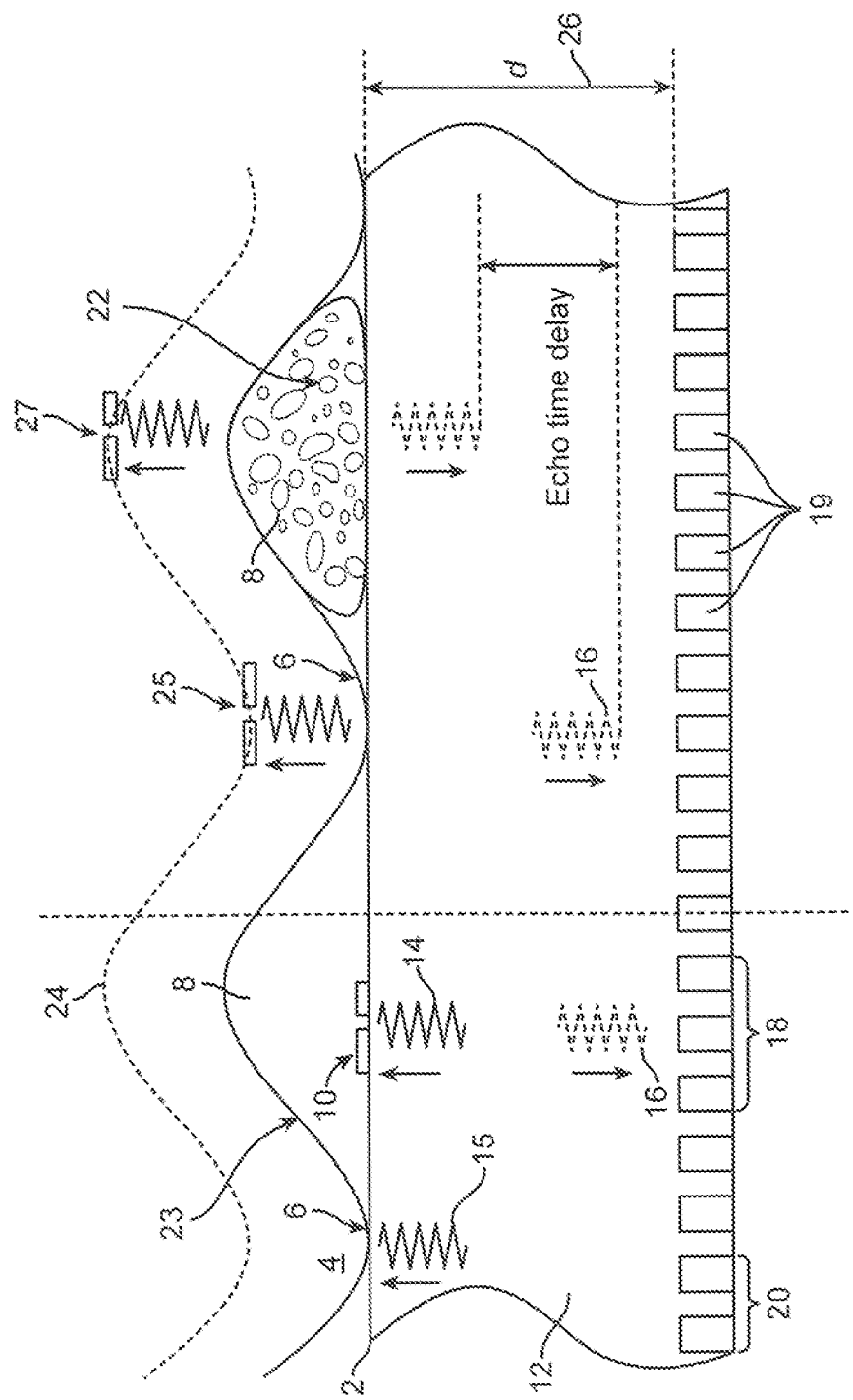
FIG. 1 shows a generalized view of the MUT fingerprint ID system detecting both epidermis and dermis fingerprint patterns.

The MUT fingerprint ID system of the present invention provides unique capabilities to existing personal electronic devices with minimal design modification, providing a new dimension of capabilities to current consumer products. Moreover, the MUT fingerprint ID system is the foundation for the development of entirely new personal identification products and capabilities.

In contrast to conventional ultrasonic fingerprint sensors based on a bulk piezoelectric transducer, the MUT fingerprint ID system has advantages of a small size, easy fabrication, and easy integration with electronics. Moreover, it has a fast response time because of its electronic scanning feature, replacing prior mechanical scanning. Additionally, the MUT fingerprint ID system features unique engineering designs which solve the near isotropic sound propagation resulting in poor directivity which have sharply limited the broad application of prior systems.

The many features of the MUT fingerprint ID system design options work synergistically to provide the optimum advantages to a specific need. Each option can be selected to work with the greatest advantage to the system as a whole, and to its specific application. Thus, while these features are discussed individually below, with some example embodiments, they will be selected or modified by the designing engineer to best accommodate the goals and needs of the complete system, as well as the devices for which the MUT fingerprint ID system will be a feature.

Before the present invention is described in greater detail, it is to be understood that this invention is not limited to particular embodiments described, as such may, of course, vary. The invention encompasses various alternatives, modifications, and equivalents, as will be appreciated by those of skill in the art. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order which is logically possible.

Any publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

Micromachined Ultrasonic Transducer Elements

The MUT fingerprint ID system is distinguished from currently available ultrasonic fingerprint sensors in that it employs in its design micromachined ultrasonic transducers (MUTs). No MUTs, including CMUTs and PMUTs, have been used for fingerprints sensing beyond preliminary research efforts before the advent of the MUT fingerprint ID system.

Currently, two types of MUTs are generally available, capacitive MUTs (CMUTs) and piezoelectric MUTs (PMUTs). These are described in the specific examples of the MUT fingerprint ID system provided below. However, other MUTs would also be considered for use in the MUT fingerprint ID system, depending on intended application and other engineering design considerations.

PMUTs and CMUTs have similar appearances. The basic structure of the CMUT or PMUT is a flexurally-vibrating membrane. By vibrating this small membrane, the MUT launches sound.

What differentiates the PMUT and CMUT is that the PMUT is provided with a piezoelectric layer. This piezoelectric layer creates mechanical motion in response to applied electric field. By contrast, the CMUT is provided with two conductive layers. Both the membrane and the fixed counter-electrode (or wafer) are conductive. Voltage is applied between the membrane and the counter-electrode. This develops an electrostatic force.

Therefore, the construction of CMUTs and PMUTs is very similar. However, in the case of the PMUT, a piezoelectric layer is provided. In the case of CMUTs, the piezoelectric layer is absent, but is replaced with overlapping conductive layers.

CMUTs have been used for a variety of medical and other imaging purposes. These devices are typically provided through the construction of arrays of CMUTs, and are operated as arrays. In some instances, this detection is accomplished at relatively low frequencies.

For the purposes of the MUT fingerprint ID system, this general type of ultrasonic imaging is conducted at higher frequencies than is conventionally used for medical purposes. The area of medical ultrasound provides some clues to optimization of the MUT fingerprint ID system. However, a very different approach, using very high frequencies and very short range, is used by the MUT fingerprint ID system.

The MUT fingerprint ID system is distinct from prior medical device applications as it penetrates only a few hundred microns into the tissue instead of the millimeters or more required by medical devices. This allows the MUT fingerprint ID system to provide images of various structures both on the surface of the skin and beneath the skin, including the fingerprint image, e.g., in some instances topographical detail of a 3D fingerprint.

Directivity

Both CMUTs and PMUTs are micro-electro-mechanical systems (MEMS) devices manufactured using semiconductor batch fabrication. Each MUT can transmit and receive acoustic waves. Acoustic waves are generated as follows: when a voltage is applied across the bottom and top electrodes, the transducer membrane vibrates, generating an acoustic wave in the surrounding medium. Conversely, an arriving acoustic wave creates motion in the MUT, producing an electrical signal.

A MUT has a radius a that is small relative to the acoustic wavelength at which measurements are performed. As a result, the sound spreads in many directions, i.e. the directivity of an individual MUT is weak. This characteristic has limited the application of these components to providing fingerprint detection on a broad scale.

The MUT fingerprint ID system has unique engineering design strategies for the MEMs structure that solve the directivity problem. As describe in more detail in the examples below, the present inventors have developed two specific design strategies to provide directivity. With this breakthrough in design strategies, additional variants will be readily understood by one of ordinary skill in the art.

In one embodiment of the MUT fingerprint ID system, the backside etching forms a tube which acts as a wave confiner. In this approach, the emitted wave is confined inside the tube rather than propagating in all directions. As a result, nearly all the acoustic waves confined in the tube propagate to the user's finger directly no matter how large the beam-width is for the original PMUT.

In another embodiment of the of the MUT fingerprint ID system, a phased array of transducers is used to achieve a highly directional, focused acoustic beam. By appropriately adjusting the phase (delay) of the signal applied to each channel, the acoustic beam can be focused to a desired depth. For the same focal position, an array with more channels will focus the acoustic beam to a smaller diameter, but too many channels will make electronics more complex and expensive.

An alternative way to reduce the focal diameter for an array with a given number of channels is to increase the pitch between the transducers in the array, thereby increasing the aperture of the array. For fingerprint sensing, it is desirable to have a focal diameter of about 50 µm or less. For a transducer array operating 40 MHz, a 6-channel array has a focal diameter below about 50 µm when the transducer pitch is 150 µm. The fingerprint image is collected by scanning the acoustic beam across the finger.

In some embodiments of the MUT fingerprint ID system, image resolution is from about 50 µm to 130 µm, specifically about 70 µm to 100 µm, more specifically about 75 µm to 90 µm, and most specifically about 80 µm.

Bandwidth

MUT fingerprint ID system bandwidth can be optimally selected based on the intended application, and the particular device configuration, as will be readily determined by an artisan of ordinary skill. Ranges can be selected from about 10 MHz to about 100 MHz, specifically from about 10 MHz to about 50 MHz, and more specifically from about 10 MHz to about 20 MHz.

For currently available transducers, the range of about 10 MHz to about 50 MHz is a comfortable design range. However, ranges higher than about 100 MHz can be interesting design choices for certain applications. When considering such alternatives, consideration must be taken to design transducers that have sufficient signal to noise ratio at frequencies in this high range. While results can be improved with higher frequencies, upcoming engineering design improvements of transducers will be important to accomplish those advantages.

In designing systems, transducers at 100 MHz will produce systems where the charge output is substantially smaller. With careful design, transducers that have good signal to noise ratio are possible. With expected advances, in the near future devices can be operated in those high ranges. Medical transducer construction and function is instructive to that end.

Energy & Power Consumption

Many applications of finger print sensors e.g. in battery powered devices, require ultra-low power dissipation. Fortunately, the MUT fingerprint ID system can be designed to meet this requirement. Specifically, if appropriately designed, the MUT fingerprint ID system consumes less than 1 mJ of energy each time a finger print is acquired, with 10 µJ to 500 µJ a more typical range that varies as a function of system parameters such as the resolution of the print (e.g. 500 dpi versus 300 dpi), scheme used (e.g. if phased array beam forming is employed or not) and fabrication technology.

The frequency at which the MUT fingerprint ID system is used is highly dependent on the application. For example, MUT fingerprint ID system when used in smart phones may be used each time the device is activated by the user, typically a few times per hour or day. High security applications may require frequent re-verification, for example each minute. Door locks equipped with fingerprint sensors controlling e.g. access to residential homes may be used only a few times per day.

In all cases, to minimize energy consumption the MUT fingerprint ID system can be activated only when used. The activation can be controlled for example with software, by a capacitive sensor, or the MUT array itself. In the latter case, only a single or small number of MUT elements are activated periodically, for example ten times per second. Since only a few elements are activated, the power dissipation of this operation is very low (typically less than or much less than 1 µW depending on the design). If a finger or other object is detected, the entire MUT array is activated to acquire a fingerprint pattern. Thanks to the resulting very low average power dissipation the fingerprint sensor can replace the on-switch in many applications such as smart phones: the MUT fingerprint ID system is turned on only when a valid fingerprint is recognized with no other steps needed. This mode of operation affords maximum convenience and security to the user.

The energy stored in a CR2032 lithium coin cell battery is 2000 to 3000 Joules, allowing several million finger print recognitions. If, for example, the MUT fingerprint ID system is used once per hour, the coin cell would last over 40 years if used only for powering the fingerprint ID component of the device. Since smart phone batteries have an order-of-magnitude higher energy capacity, the addition of a MUT fingerprint ID system to such a device would result in negligible reduction of the running time per battery charge.

To substantiate these figures, some of the present inventors have developed an estimate of the power dissipation below. The actual power dissipation by a particular implementation will deviate from this estimate because of variations in the design. Nevertheless, this estimate provides useful guidance and can easily be adapted to other situations by anyone skilled in the art.

Consider a fingerprint sensor with a total area of 1 cm by 2 cm. Assuming 500 dpi resolution, this sensor will consist of an array of 200 by 400 individual MUTs.

Energy consumption during the transmit phase is dominated by charging and discharging the capacitance of the MUTs and the electrical wiring. Although this capacitance depends on details of the fabrication technology, the capacitance per MUT will typically be less than, and often much less than 1 pF.

Driving all MUTs with 10V for 4 cycles consumes 16 µJ of energy. Depending on requirements of the application, all transmitters can be activated at once, or sequentially, or anything in-between. Energy consumption is independent of the strategy used. In the phased array mode the energy consumption is higher since several (e.g. 21) MUTs are activated to sense a single point.

The energy required for reception consists of the energy required for amplifying the signal and the energy required for the analog-to-digital conversion of the signal. Since the receiver needs to be active for only a short period after an acoustic pulse has been transmitted, energy consumption can be reduced drastically by power gating. For example, an acoustic signal traveling 300 µm to 750 µm from the transducer to the dermis and back at a typical sound velocity of 1500 m/s experiences a 200 ns to 500 ns delay during most of which the receiving amplifier must be ready to accept and amplify the echo.

Assuming 1 mW average power dissipation for an amplifier with approximately 1 GHz bandwidth, the energy required to process the echoes at all 200 by 400 MUTs is 40 µJ. An 8-Bit analog-to-digital converter operating at 100 MHz to convert the echo amplitudes to digital signals consumes a similar amount of energy.

In summary, the total energy required to transmit, receive, and digitize the acoustic signals in a 1 cm by 2 cm MUT array is 16 µJ+2×40 µJ or about 100 µJ if no beam forming is used. With beam forming, the energy is one to two orders of magnitude larger, depending on the number of MUTs activated per beam.

Additional energy is required to process, identify, and validate fingerprints acquired by the MUT array. The level of energy required depends on the processor and the complexity of the algorithms used and for efficient realizations is typically less than 1 mJ.

Generalized System Design

In the most general case, MUT fingerprint ID sensor generates highly directional acoustic pulses, which transmit and reflect at the interface of two materials with different acoustic impedance. A coupling material with acoustic impedance similar to that of human tissue is filled in between the ultrasonic transducers and the top surface of the sensor where the user's finger makes contact.

The MUT fingerprint ID system generates highly directional acoustic pulses, which transmit and reflect at the interface of two materials with different acoustic impedance. A coupling material with acoustic impedance similar to that of human tissue is filled between the ultrasonic transducers and the top surface of the sensor where the user's finger makes contact.

The human fingerprint consists of a pattern of ridges and valleys which have different acoustic impedance, resulting in measurable differences in the intensity of the reflected ultrasound. The same pattern is present on both the dermis and epidermis: the epidermal reflections arrive earlier than the deeper dermal reflections and time-gating can be used to select whether the sensor records the dermal or epidermal fingerprint.

Existing non-ultrasonic fingerprint sensors sense only the epidermal fingerprint and are prone to errors created by dry, wet, dirty or oily skin. The MUT fingerprint ID system avoids these errors and limitations by allowing the dermal fingerprint to be measured. Compared with currently available ultrasonic fingerprint sensors based on a bulk piezoelectric transducer, the MUT fingerprint ID system has advantages of a small size, easy fabrication, easy integration with electronics, and fast response because of electronic scanning instead of mechanical scanning.

The MUT fingerprint ID system avoids the mechanical scanning needed by earlier ultrasonic fingerprint sensors. One embodiment of the sensor is based on an array of PMUTs, described below. Alternatively, CMUTs can be used. Both CMUTs and PMUTs are micro-electro-mechanical systems (MEMS) devices manufactured using semiconductor batch fabrication.

Each MUT can transmit and receive acoustic waves. Acoustic waves are generated as follows: when a voltage is applied across the bottom and top electrodes, the transducer membrane vibrates, generating an acoustic wave in the surrounding medium. Conversely, an arriving acoustic wave creates motion in the MUT, producing an electrical signal.

FIG. 1 shows the basic concept of the MUT fingerprint ID system. The MUT fingerprint ID system is designed to detect echoes from the detector surface 2, the epidermal layer 23 or the dermal layer 24.

If the epidermal layer 23 has an epidermal ridge 4 that is in contact with the detector surface 2, providing an epidermis ridge contact point 6, there will not be an echo returning from a transmitting wave 15 from the detector surface 2 at this point. Thus, where an epidermal ridge 4 is in contact with detector surface 2, there will be no (or only a very weak) echo from that surface.

By contrast, if there is an epidermis valley 8 above the detector surface 2, the epidermis valley 8 then contains air. In this case, a transmitting wave 15 will produce a very strong echo wave 16 at the air interface 10 from the detector surface 2, that is at the surface of the MEMS chip.

The echo wave 16 is produced from the detector surface 2 because the interface between the air and the coupling material 12 results in a strong acoustic impedance difference at air coupling interface 10. At this point, the sound in transmitting wave 14 does not transmit through the air in epidermis valley 8. As a result, the transmitting wave 14 will bounce off of the detector surface 2 and reflect back as echo wave 16. That is the first way the transmitting wave 14 functions within the MUT fingerprint ID system.

An analogy can be drawn from the image from of a photographic camera to the signal produced by the above transmitting wave 14 reflecting selectively on detector surface 2, resulting in various strengths of echo wave 16.

There is a very strong echo where there is air above the detector surface 2, so this area would look 'white' in the image produced, because of the very high signal intensity. By contrast, where an epidermal ridge 4 is in contact with detector surface 2, there will be no echo from that surface, so this area would look 'black' as detected by the ultrasonic transducers 19.

In the intervening spaces between these points, that is the epidermis ridge contact point 6 and at the peak of epidermis air coupling interface 10, the signal would produces many 'shades of grey', defining a three dimensional topography of the fingerprint, including many subtle anatomically distinctive features.

The image detected by ultrasonic transducers 19 is then subject to signal processing in order to produce the three dimensional image described above. In that image, it would look like epidermis air coupling interface 10 is an area of high intensity, so it would be bright. By contrast, most of the sound transmits through epidermis ridge contact point 6. Because most of the sound transmits through the area of epidermis ridge contact point 6, it will be fairly dark.

The signals detected by the ultrasonic transducers 19 can be sampled by clustering signals from adjoining transducers. By example, ultrasonic transducer cluster 20 can sample a specific area, where singly they would not receive sufficient signal to provide detection. Similarly, ultrasonic transducer cluster 18 would provide a full survey of the echo wave 16 returning directly to them.

In the different embodiments of the MUT fingerprint ID system, the transducers will receive sound in different ways. However, the important feature of the system is the sound's source, that is the way the echo is coming from the surface interface. Thus, for detecting the epidermis, it is not critical where the transducers are positioned, but rather where the reflection happens.

Referring now to the right half of FIG. 1, an additional method for three dimensional imaging of a fingerprint is provided. In some cases of practical usage of the MUT fingerprint ID system, there will be contamination 22, between the finger and the detector surface 2. By example, this contamination 22 can be composed of oil, dirt, water, or anything other than air. The contamination 22 may have been on detector surface 2 prior to the finger being placed on the surface, or may have been on the finger in advance of placement on detector surface 2.

In this case, the sound will pass through the epidermis valley 8 containing contamination 22 to reflection interface 27 at dermis layer 24. At the adjoining point, the sound will pass through the epidermis ridge contact point 6 to reflection interface 25 on the dermis layer 24. As a result, there will be little or no echo produced at the first interface with epidermis layer 23. Instead, the sound propagates to the dermal layer 24, and at the dermis point strong or weak echoes will be produced.

For perspective, the height of the epidermis valley 8 is typically about 75-150 μm, more specifically about 100-120 μm. However, because these dimensions are given by the anatomy, including the air depth of the valley in the fingertip skin surface, these dimensions are as variable as each individual. The same is true of the actual distance between the dermis and the epidermis, so those distances are given by the human body.

The distance between the transducer array and this first surface, that is coupling material thickness 26, will be selected for the preferred purpose of the system, but generally can be from about 50 μm-2 mm, specifically from about 50-500 μm, and more specifically about 100-300 μm, although it may also be made even smaller, such as about 50-120 μm, and more specifically about 75-100 μm.

The analysis of any propagating acoustic or electromagnetic wave in some instances includes a far-field and near-field region. While far-field imaging is characterized by relatively smooth variations over space, the near-field regime often exhibits sharp intensity variations, making imaging difficult. As demonstrated in experiments of the present inventors, the transducers used in MUT fingerprint ID system are so small relative to the operating wavelength that there is no near field region. This fact allows the formation a focused beam very close to the surface of the MUT array.

Figure 2:
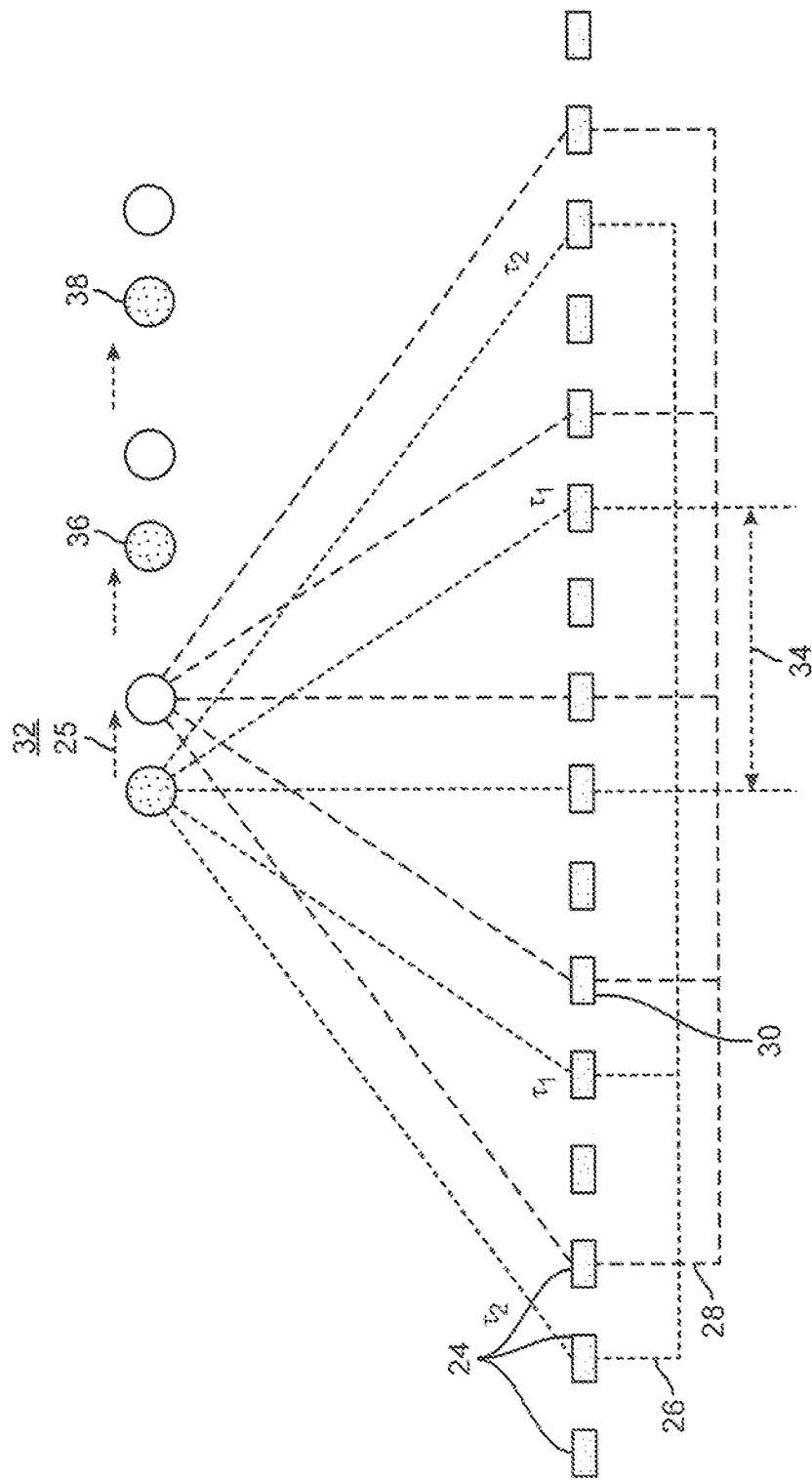
FIG. 2 shows the MUT fingerprint ID system phased array embodiment with transducers subgroup scanning.

FIG. 2 shows another embodiment of the MUT fingerprint ID system which uses a phased array of transducers to achieve a highly directional, focused acoustic beam. By appropriately adjusting the phase delay of the signal applied to each channel, the acoustic beam is focused to a desired depth. For the same focal position, an array with more channels and therefore larger aperture will focus the acoustic beam to a smaller diameter. However, an array with too many channels will make the electronics more complex and expensive.

In this embodiment of MUT fingerprint ID system, a phased array of transducers is used to achieve a highly directional, focused acoustic beam. In this beam-forming approach, while a group of transducers is utilized, not all of the transducers in the array are driven. Instead, smaller groups are driven, by example about 6 to 16 MUTs in a group, such as 10 to 15. However, a narrow focal diameter is achieved by increasing the aperture of the group by driving every other MUT (thereby doubling the aperture) or every third MUT (thereby tripling the aperture). For example, an array of 6 MUTs operating at 40 MHz has a focal diameter below 50 μm when the transducer pitch is 150 μm, corresponding to an aperture of 750 microns. However, in some instances it is desirable to have a finer pitch between MUTs for scanning purposes, as described below. The MUT array can be fabricated with a 50 micron pitch, and a 150 micron pitch between the 6 MUTs in the group is created by driving every $3^{rd}$ MUT (MUT #: 1, 4, 7, 10, 13, 16). Alternatively, the array could have 75-micron pitch, in which case the group would be formed by driving every other PMUT (MUT #: 1, 3, 5, 7, 9, 11).

In a conventional ultrasonic fingerprint scanner, this scanning is mechanical. Here, the novel electronic scanning embodiment of MUT fingerprint ID system is provided where the beam is scanned by incrementally switching from one group of pixels to the next. The pitch between each MUT in the array is equal to the step-size of the scanning motion.

By example, a 50 μm pitch allows the beam to be scanned with a 50 μm step-size. Meanwhile, as described above, the pitch inside each MUT group can be enlarged to obtain a narrow acoustic beam. Finally, both a narrow acoustic beam and a small scanning step can be obtained, which subsequently contribute to a high sensing resolution and accuracy.

The beam can be scanned over the full length of the MUT array of the MUT fingerprint ID system, which is about 5-20 mm for a typical fingerprint sensor application. The beam is scanned in two axes using a two-dimensional array. Alternatively, the finger can be swiped across the array as is done in many capacitive fingerprint sensors. In the latter case, a smaller number of pixels is needed in the y-axis swiping direction.

In this embodiment of the MUT fingerprint ID system, the phase of the signal applied to the y-axis pixels is controlled electronically to focus the beam in the y-axis, or the focusing can be achieved using a cylindrical acoustic focusing lens. A novel means of controlling the phase in the y-axis is to use row-column addressing in which the bottom electrode of the pixels is patterned and connected on each row. As a result, the phase delay of the signal is able to be applied to each channel, and a small focus area is obtained in both x and y axis.

As shown in FIG. 2, this additional strategy to separate these images is based on the time of flight of the echoes, and determining which echo comes first. Referring back to FIG. 1, with a short time delay, an echo is discernible under epidermis valley 8. The echoes that come from the dermis layer 24 are received later. Because they have to propagate further into the tissue, by using time gating, the image to be received is selected.

Data is collect for both the epidermis layer 23 and the dermis layer 24 of the same finger. This is possible because the dermis image collected is deeper, with a resulting longer time delay. By contrast, the epidermis image collected is more shallow, as it is on the surface of the skin, with a resulting shorter time delay. The image is collected with the short time delay recording, but both can be collected essentially simultaneously.

These two images are fused, providing the best, most accurate, rendition of the fingerprint. Because the two images contain the same information, but may have missing patches, a more complete, combined final data set is obtained from the information gleaned from both data sets FIG. 2 shows the beam forming design embodiment of the of the MUT fingerprint ID system. This beam forming design was inspired by the analogous medical imaging area. The configuration has a fairly large array of MUTs 24. The MUTs are arranged into groups; two groups 26 and 28 are illustrated here by way of example. The MUT pitch 30 is the distance between the adjacent MUTs 24 and is the same as the scanning step size 32 of the focused acoustic beam 25. When the excitation is switched from group 26 to group 28, the focused beam undergoes incremental motion with step size 32 equal to the MUT pitch 30. The intragroup pitch 34 is the pitch between the MUTs within the same group. By way of example, in FIG. 2 the intragroup pitch 34 is equal to four times the MUT pitch 30.

MUT pitch 30 determines scanning step size 32. In some embodiments of the MUT fingerprint ID system, the MUT pitch 30 can be from about 10 µm to 130 µm specifically from about 30 µm to 60 µm, and more specifically from about 48 µm to 52 µm. If the step size 32 is 50 µm, this corresponds to 500 dpi resolution for fingerprint identification at the criminal justice requirement level. However, achieving 250 dpi resolution requires only 100 µm step size. The latter level of fidelity is very acceptable for most consumer applications. For clarity, MUT pitch 30 is the spacing between adjacent MUTs 24 in the array, and the spacing between MUTs within the same group is the intragroup pitch 34.

Intragroup pitch 34 and the frequency of the transducer determine the focus diameter. If the operating frequency is decreased, a larger intragroup pitch 34 is required to keep the same focus diameter. The focus diameter determines the lateral resolution of the image, which is typically useful at about 50 µm. Depending on the frequency of the transducers, a particular group pitch is required to achieve a 50 µm spot size. By example, there can be 11 elements in the group and a 100 µm pitch between the elements in the group. Therefore, intragroup pitch 34 would be 100 µm.

These MUT fingerprint ID system embodiments can be scaled down when appropriate to the applications. By example, if the frequency was decreased from 40 MHz to 20 MHz, the intragroup pitch 34 would be doubled from 100 µm to 200 µm to maintain the same focused beam diameter. This would be the case when keeping the same number of elements in the group, that is 11. With these teachings of various embodiments, a practitioner of ordinary skill in the art will adjust the system to best advantage for a particular application.

The focus spot is generated by varying the delay by applying a pulse signal to the transducers. A varying time delay is provided to the elements in the array such that the beam will be focused to a point at the finger-chip interface. This system provides enough depth of focus that that focus spot 25 still remains small at the first interface of the epidermis and at the deeper interface with the dermis. Once focus spot 25 is focused, it will be remain focused during the scanning process. The inventors' research has provided plots that show the depth of focus for a nominal design to be about 1.5 mm, this information is included as FIG. 12.

These elements are driven as a phased array, and the beam is formed by appropriately controlling the time delays. All the transducers 24 in the group receive the signal. The 11 elements in a group act together to produce the sound, and those 11 elements detect the echo. This is beam forming and requires the array to work like a phased array.

The output beam can be steered over a range of angles by continuously varying the phase of the drive signals applied to the transducers in a group. Another strategy is to maintain the focused spot 25 at a point centered above the group, as shown in FIG. 2, and do the scanning of the spot by switching from one group to the next group. The transducers can be used as the system moves from group 1 to group 2 to group 3, and then back again. The incremental motion of the spot over the array continues by switching from group to group, allowing advancement of the beam (and the point where the image is being taken) by the scanning steps 25, 36 and 38, etc.

Figure 3:
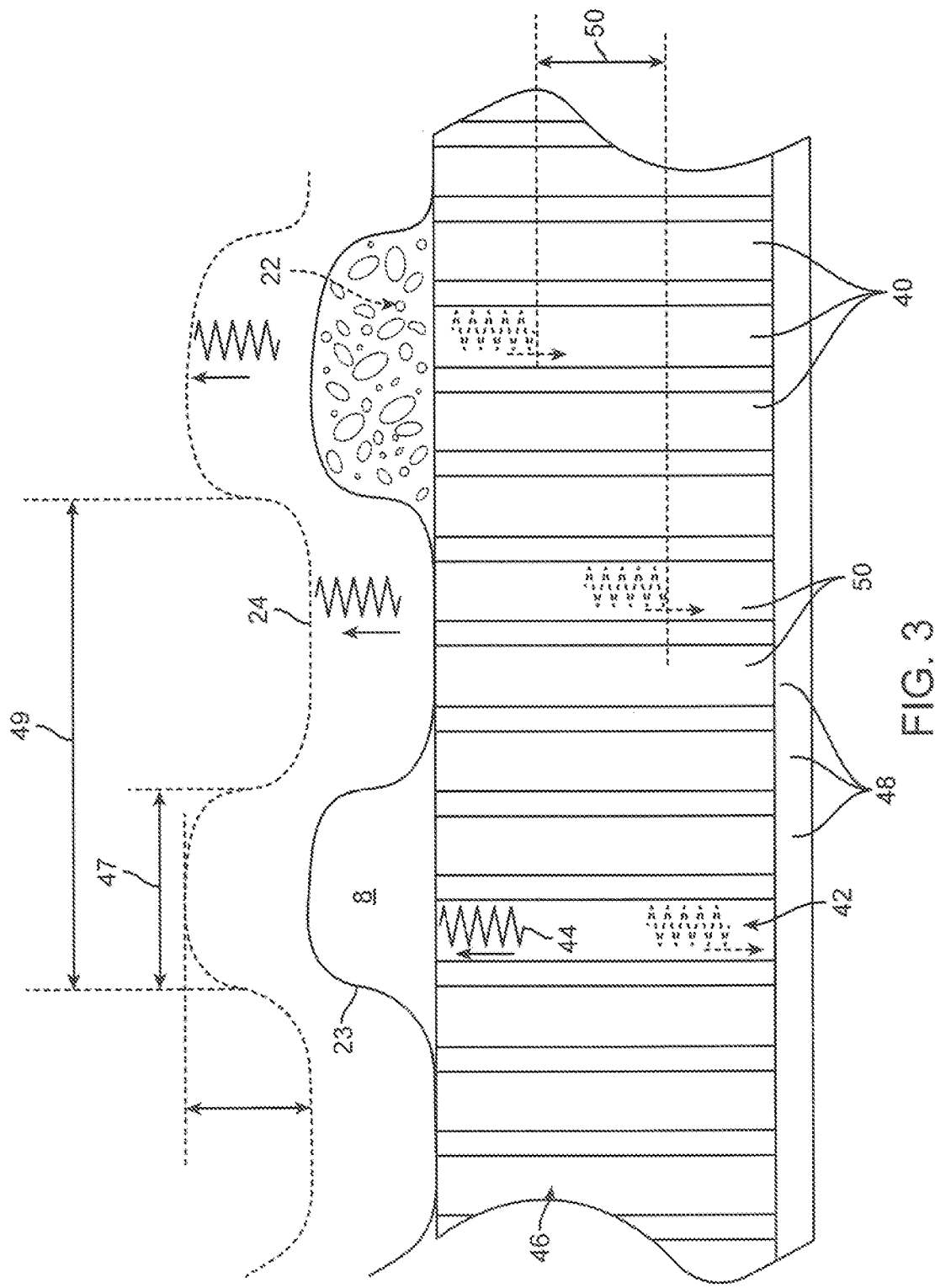
FIG. 3 shows a non-beamforming system employing acoustic waveguides to detect both the epidermis and dermis layers.

FIG. 3 shows an embodiment of the MUT fingerprint ID system whose core engineering design is a non-beamforming system employing acoustics. In this particular example, piezoelectric micromachined ultrasonic transducers (PMUTs) are utilized. PMUTs, as with other MUTs, have the advantages of small size, easy fabrication, and easy integration with electronics.

The PMUT embodiment of the MUT fingerprint ID system achieves a fast response time. Because this MUT fingerprint ID system design eliminates the need for mechanical scanning, it can function in an electronically-scanned live scan mode.

The main feature of the PMUT embodiment of the MUT fingerprint ID system is the use of acoustic wave guides in lieu of, or in some cases augmented by, electronic phased-array beam focusing approaches. In this embodiment, an array of PMUTs generates highly directional acoustic pulses, which transmit and reflect at the interface of two materials with different acoustic impedance. A coupling material with acoustic impedance similar to that of human tissue is filled between the ultrasonic transducers and the top surface of the sensor where the user's finger makes contact.

The fingerprint consists of a pattern of ridges and valleys which have different acoustic impedance, resulting in measurable differences in the intensity of the reflected ultrasound. The same pattern is present on both the dermis and epidermis. The epidermal reflections arrive earlier than the deeper dermal reflections and timegating can be used to select whether the sensor records the dermal or epidermal fingerprint. By this method, the PMUT embodiment of the MUT fingerprint ID system avoids or mitigates errors created by finger contamination and dry, wet, dirty, or oily skin, which are the major sources of error in existing optical and capacitive fingerprint sensors.

In the case of a fine pitch PMUT array (about <50.8 μm), the pitch of the PMUT array will typically be smaller than 50.8 μm to achieve a final 500 DPI image resolution. This resolution is the rule established by the FBI for an authenticating fingerprint sensor for the purposes of criminal investigations.

A large PMUT bandwidth (>10 MHz) can be provided. The height h of fingerprint pattern is around 75-150 μm. To avoid overlap between acoustic echoes from the dermis layer and epidermis layer, the pulse duration t will typically be smaller than $2h/c$, where $c=1500$ m/s is acoustic speed in tissue. Consequently, the PMUT bandwidth will normally be selected at larger than $1/t=10$ MHz.

It is often desirable in various embodiments of the MUT fingerprint ID system that the PMUT array produces sufficient acoustic output at a low drive voltage, ideally less than 10V. The drive voltage can range from about 1V to 32V, specifically from about 2V to 15V and more specifically from about 3V to 8V.

In this PMUT embodiment of the MUT fingerprint ID system, the acoustic beamwidth will typically be about <100 μm. The focused acoustic beam size defines the accuracy of the fingerprint detection. Considering the fingerprint pattern's dimensions (ridge width about 100-300 μm, period ~500 μm), a focus size smaller than about 100 μm is employed to recognize the difference between ridges and valleys.

The concept for the PMUT embodiment of the MUT fingerprint ID system is that in the case of most currently available ultrasonic transducers, if a single transducer is utilized, very wide beam width results. In this embodiment, waveguides 40 are provided to confine an individual PMUTs acoustic output such that a pulse-echo measurement from each PMUT can be conducted individually.

The waveguides 40 function to confine the ultrasonic wave such that it can only propagate inside the waveguides 40. This makes the beam width very small, rather than omnidirectional. Each PMUT transducer 48 acts like an individual pixel of a camera, and takes an isolated image of the tissue contacting the top of its individual waveguide. Each time a transmitting pulse 44 signal is sent from one or several PMUT transducers 48, each PMUT transducer 48 receives back through coupling material 46 an echo 42 that is predominantly its own.

Within the tube-like waveguides 40 are provided coupling material 46 which has the same or similar acoustic impedance as human body tissue. As described below, water or other fluids could be used in this function. However, solids or gels are more suitable in most instances. By example, there are several kinds of Polydimethylsiloxane (PDMS) available which have acoustic impedance suitable for this purpose.

PDMS belongs to a group of polymeric organosilicon compounds that are commonly referred to as silicones. PDMS is the most widely used silicon-based organic polymer, and is particularly known for its unusual rheological (or flow) properties. PDMS is optically clear, and, in general, inert, non-toxic, and non-flammable. It is also called dimethicone and is one of several types of silicone oil (polymerized siloxane). Its current applications include contact lenses and medical devices as well as elastomers.

Other materials can be considered for coupling materials. By example, water has impedance sufficiently similar to human tissue that it could be employed for this purpose. The difference between the acoustic impedance of water and the human body is very small. However, in general, for most applications, a solid material is a better design choice than a liquid media for the coupling materials as risks due to potential leakage are minimized. Thus, PDMS is typically more practical for these applications.

As a function of waveguide 40, all the transmitting and echo pulses are confined to this waveguide. Using this design strategy, both transmitting pulse 44 and echo pulse 42 will remain within the waveguide 40 and not propagate, or have very attenuated propagation, to neighboring ultrasonic transducers 48. As a result, each transducer 48 will receive essentially only its own echo pulse 42. The echo time delay 50 as determined by comparing the relative echo pulse 42 times from some or all of the transducers 48 is then used to provide a full, three dimensional picture of the fingerprint.

Other parameters of this embodiment are similar to those describe in the general example shown in FIG. 1. For instance, the surface reflection and the dermis reflection for each pixel. The width of the fingerprint valley is about 100 μm to 300 μm. Valley range 47 is typically about 100-300 μm, representing the pitch of the ridge 49. Typically, a fingerprint ridge pitch is about 500 μm.

Figure 4:
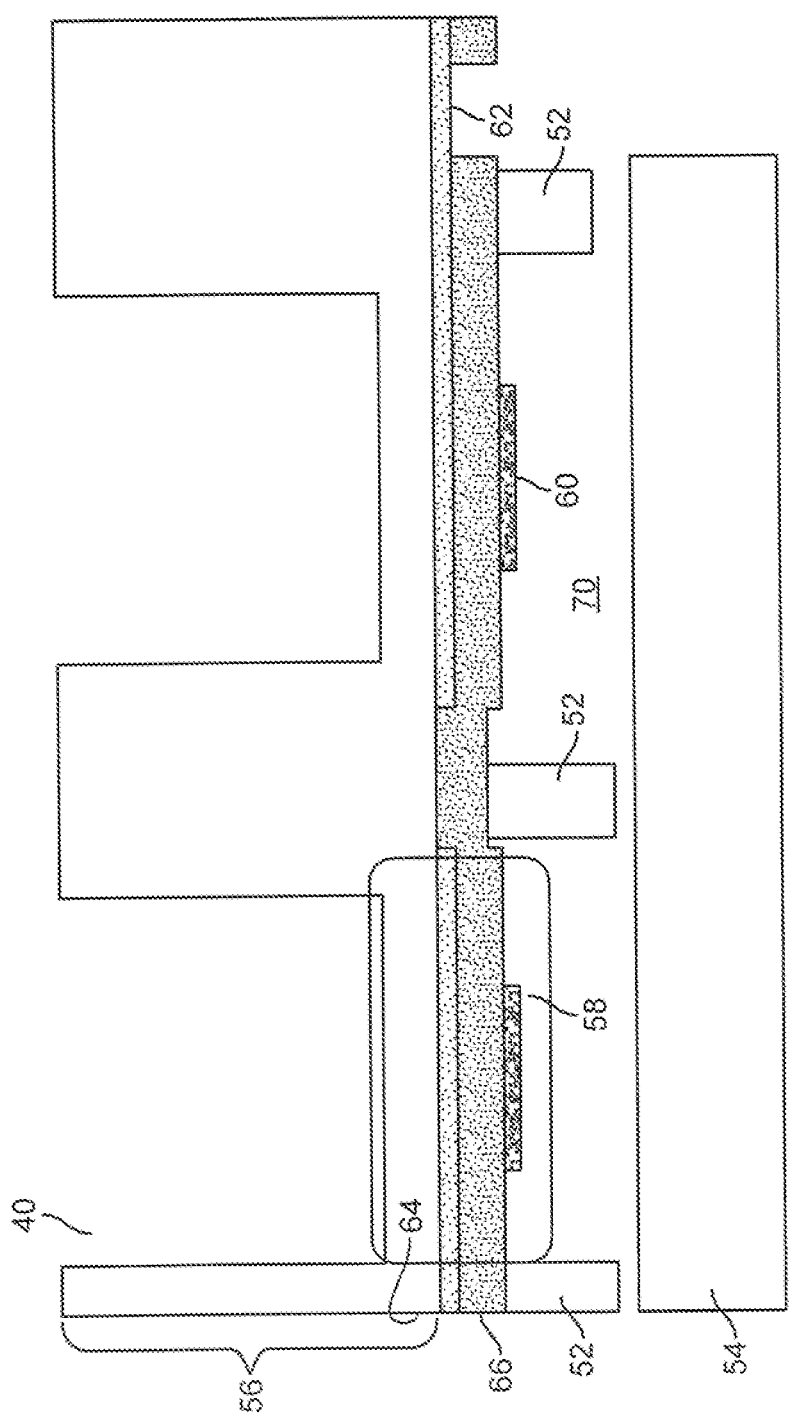
FIG. 4 shows a cross-section PMUT array embodiment of the MUT fingerprint ID system.

FIG. 4 shows the basic structure of the PMUT array in the PMUT embodiment of the MUT fingerprint ID system. Each PMUT can transmit and receive acoustic waves. When a voltage is applied across the bottom and top electrodes, the transducer membrane vibrates, generating an acoustic wave in the surrounding medium. Conversely, an arriving acoustic wave creates motion in the PMUT, producing an electrical signal. PMUTs with center frequency of about >30 MHz and pitch of about <50 μm are useful ranges for some applications.

Simulation results developed by some of the present inventors for PMUTs made with a layer stack of 2 μm Si and 0.5 μm AlN are listed in Table 1. Since the center frequency scales approximately linearly with thickness and with the inverse square of diameter, the same frequencies can be achieved in a 5 μm thick membrane by increasing the diameters by 40% to 35 μm and 42 μm.

TABLE 1

Simulated PMUT characteristics assuming 2 μm Si and 0.5 μm AlN thickness

| | Diameter (μm) | Center Frequency (MHz) | Bandwidth (MHz) | Receiver sensitivity $S_R$ (μmV/Pa) | Transmit sensitivity $S_T$ (kPa/V) |
|---|---|---|---|---|---|
| Type 1 | 25 | 46.4 | 46 | 0.13 | 2 |
| Type 2 | 30 | 30.5 | 26 | 0.21 | 2 |

A small driving voltage is desirable for the proposed fingerprint sensor to be used for portable devices. The required drive amplitude is approximated as follows: over the short (~100 μm) acoustic path length, absorption and scattering losses are negligible (~0.5 dB) and the transmission loss is dominated by the reflection ratio, R, of the selected interface. The epidermis-dermis interface produces a smaller acoustic echo than the epidermis-air interface because the acoustic impedance difference between the dermis and epidermis layers is smaller.

Using 1595 m/s and 1645 m/s as the acoustic velocities in these two layers, the reflection ratio R will be 0.015. Simulated receiver and transmit sensitivities are listed in Table 1, SR=0.13 μmV/Pa and ST=2 kPa/V, and with a 10V drive input, the expected signal level from the dermis echo is 39 μV. The expected SNR is approximately 15 dB assuming 7 μV RMS input-referred noise over a 50 MHz pre-amplifier bandwidth. This estimate is conservative: the desired imaging frame rate (<100 fps) means that the actual measurement bandwidth is orders of magnitude smaller than the bandwidth of the first amplification stage. In addition, phased-array techniques using multiple transducers driven in parallel could enable further increases in SNR.

FIG. 4 shows one possible structure for the device depicted in FIG. 3. Here, wafer bonding 52 serves both as a connection and an anchor for the transducer. The wafer bonding 52 provided on CMOS wafer 54. The circuitry for the system is provided within the CMOS wafer 54. The PMUT is located in MEMS wafer 56, typically constructed of silicon. Transducer 58 can be either CMUT or PMUT. The waveguides may be produced by plasma etching tubes into the silicon MEMS wafer. Subsequently, post-fabrication processing is accomplished to fill in the waveguide tubes with PDMS or some other coupling material.

The wafer bonding 52 anchors, and also serve as an electrical connection, between CMOS wafers 54 and MEMS wafers 56. For each MUT there will be a top electrode 60 typically constructed of metal. When the transducer is a CMUT, top electrode 60 and bottom electrode 62 are separated by an air-filled or vacuum-filled gap. FIG. 4 illustrates a PMUT having piezoelectric layer 66 between top electrode 60 and bottom electrode 62, with passive layer 64 located beneath piezoelectric layer 66. The PMUT's membrane structure is driven into vibration by applying an ac voltage across top electrode 60 and bottom electrode 66, creating an ultrasound wave that propagates into waveguide 40.

Figure 5:
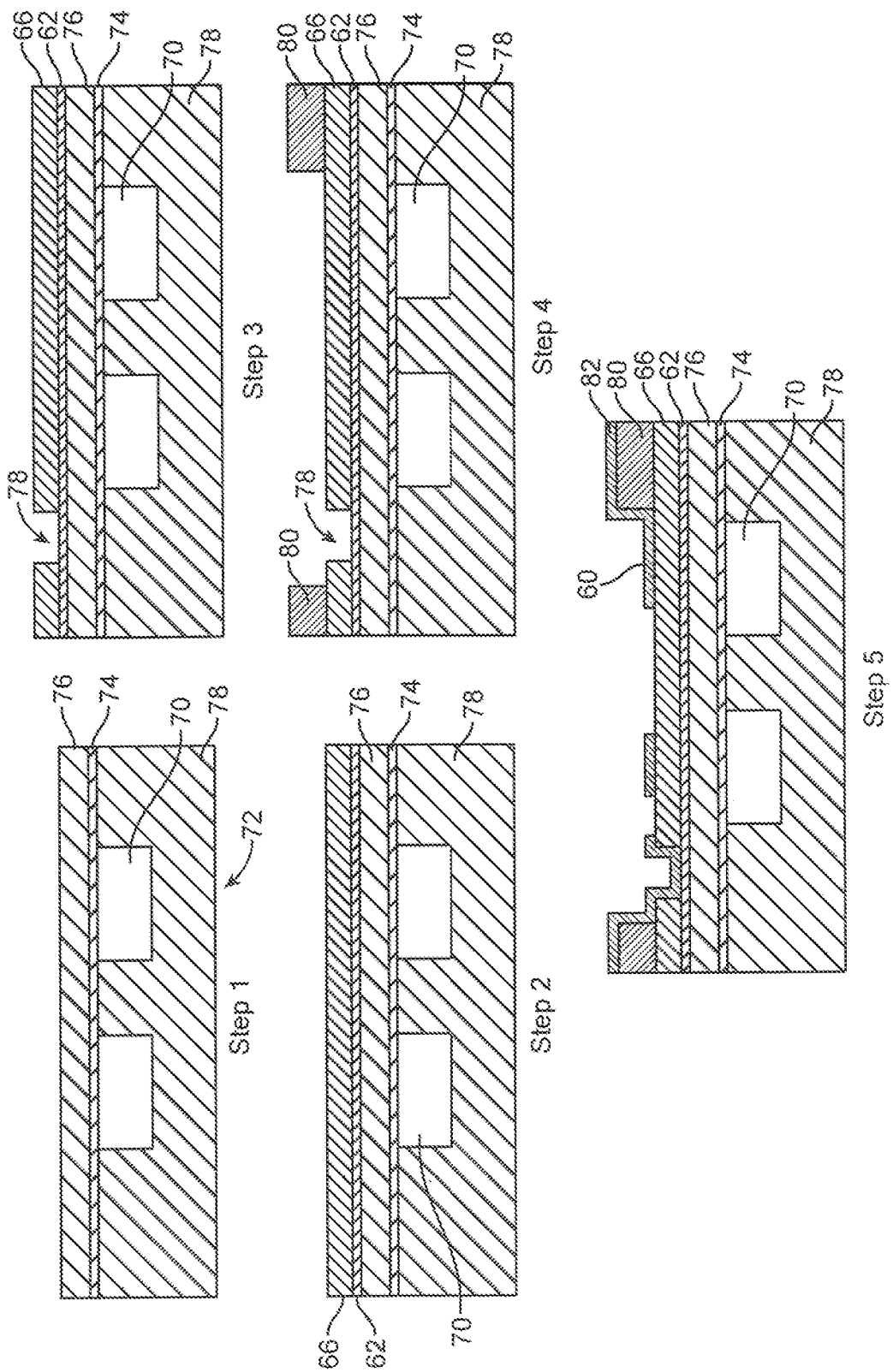
FIG. 5 is a flow diagram showing the fabrication of the MUT fingerprint ID system.

FIG. 5 is a flow diagram of a typical fabrication process for the MUT fingerprint ID system, shown in Steps 1-5. For reference, the orientation shown in FIG. 5 is flipped from that of FIG. 4, with which it shares many of the same features. This is because this is the orientation during manufacture rather than use.

Step 1 of the fabrication process shows cavity SOI 72 as the base structure, including cavity 70. This style of wafer can be obtained premade from the foundry. In this case, it is termed a cavity SOI.

An alternative approaches is for the cavity to be made as part of the construction process, along with the wafer bonding. Components shown of the cavity SOI 72 of Step 1 are silicone oxide layer 74, positioned between device silicone layer 76 and silicone substrate layer 78.

Step 2 of the fabrication process includes deposition on the surface of device silicone layer 76 of bottom layer 62, typically constructed of (BE) Pt/Ti, and piezoelectric layer 66.

Step 3 of the fabrication process includes via etching 78 of piezoelectric layer 66, typically using wet etching, to open bottom electrode 62.

Step 4 of the fabrication process includes oxide deposition and patterning of capacitance reducing layer 80 at the edges of piezoelectric layer 66. This step is only one more layer, the top electrode, which is made of patterned materials.

Step 5 of the fabrication process includes aluminum film deposition of metal layer 82, forming top electrode 60 and bottom electrode 62. It is important to open the layer at this point so that this metal layer connects to the bottom electrode, becoming part of bottom electrode 62.

Figure 6:
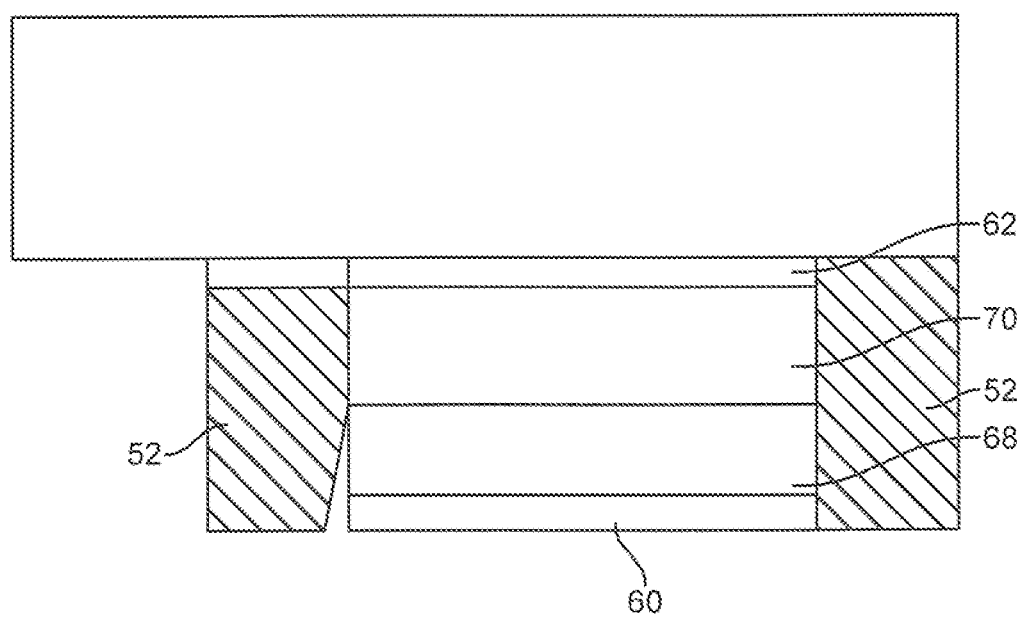
FIG. 6 is the system architecture that is particularly useful with CMOS.

FIG. 6 provides a generalized depiction of a system architecture that is particularly useful in employing CMUT transducers for the MUT fingerprint ID system. However, this structure can also employ PMUT transducers in some circumstances. The construction of the device in FIG. 6, in contrast to the embodiments shown in FIG. 4, has no cavity. The architecture of the top of both of these device, however, is of a similar construction.

In common with the prior described embodiments, as shown in FIG. 6, the design still includes anchors 52, top electrode 60 and bottom electrode 62. However, a vacuum or air-filled gap 70 separates top electrode 60 and bottom electrode 62. Shown in the figure is an optional electrical insulation layer 68 covering top electrode 60. If an ac voltage is applied between the top and bottom electrode, again this insulation layer 68 along with the top electrode 60 will start vibrating. Just as in FIG. 4, it will be the active layer vibrating. The insulation layer 68 along with the top electrode 60 will also emit an ultrasonic wave. As a result, these embodiments appear almost the same, however they differ in the construction of the MUT. Thus these embodiments achieve the same function but with a different approach.

Figure 7:
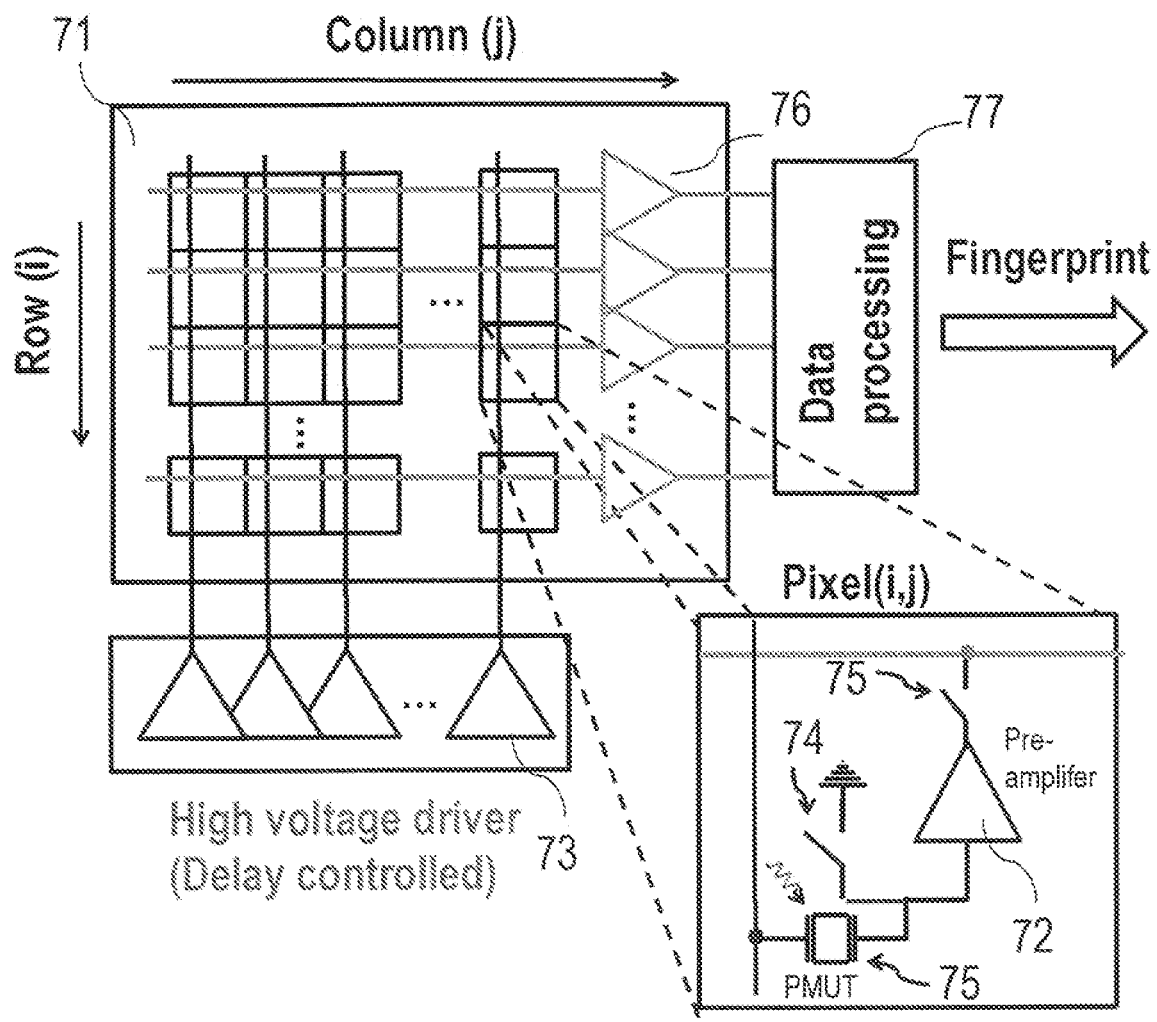
FIG. 7 shows the basic ASIC structure of the MUT fingerprint ID system.

FIG. 7 shows an example electrical control and system of the MUT fingerprint ID system with different phase delays. The PMUT array 71 is patterned such that all the PMUTs in the same column share the same top electrodes (blue lines), while every PMUT's bottom electrode connect to local pre-amplifier or buffer circuitry 72. This can be done by, for example, pin-out, wafer bonding between circuit wafer and MEMS wafer, or monolithic process that enables circuitry and MEMS on a same die.

In transmitting mode, the high voltage driver 73 send out a sequence of pulses, which could be delay controlled. Meanwhile, the switches 74 inside each cell in the array are closed via circuitry. Consequently the PMUT 75 is excited and send out a pulse with delay determined by the phase delay of the applied signal on top electrodes.

For the method 1, no beam-forming is needed, and hence each time only 1 of the columns, for example, column j is excited with the high-voltage driver. Hence all the PMUT on that column will be excited. When receiving the column is selected by circuitry and switch 75 is closed among all the cells in column j. Hence the signal on PMUT would be amplified and buffered by buffer 76 and directed into data processing unit 77 to provide a fingerprint image. The data processing unit might contain necessary data converter, variable gain amplifier, digital beamformer, and other hardware to produce fingerprint image.

For beamforming method, different phase delays are applied to different columns to gives X-direction beam-forming as shown in FIG. 2. To perform incremental scanning, the delay applied is shifted between high-voltage driver. The Y-direction beam-forming is done by data processing unit with the data comes from different rows. The receiving scheme and control is similar to method 1.

MUT Fingerprint ID System Enabled Consumer Products

The MUT fingerprint ID system is ideally suited for incorporation into existing consumer product designs, and, in later stage adoption, to enable entirely new products with unique functionality. The unprecedented small size, robust solid-state construction, and orders of magnitude lower cost per unit than current fingerprint ID systems opens a new era in personal identification capabilities, with transformational impact on personal electronic devices, many other consumer goods, and entry enablement devices.

Because an ultrasonic wave, unlike its light counterpart, can propagate through opaque samples, most materials are ultrasound transparent. Therefore, the MUT fingerprint ID system can enable existing personal electronic surfaces while still maintaining a standardized appearance. In some cases, the identification surface will be paired with other functional surfaces of the device, such as camera lenses, speakers or microphones, to simplify electrical connection to the device circuitry. Internet enabled objects can be provided with authenticated fingerprints remotely, while others are programmed at the device.

Computer Access Authentication

The MUT fingerprint ID system represents a transformational advancement in e-authentication, and is the successor to computer numeric and alphabetic passcodes. MUT fingerprint ID system will displace computer file user names, passwords, passcodes, and paraphrases, among others. Besides providing a much higher level of security, the MUT fingerprint ID system represents a substantially decreased burden on computer and internet users.

The MUT fingerprint ID system provides an unprecedented level of personal authentication for on-line and other computer file access. Additionally, consumers will enjoy freedom from the current burdensome system of diverse password requirements for the multitude of systems to which they need access. Because of the fallible nature of password security, some systems even require new passwords and complex paraphrases be generated on a regular basis. As a result, many passwords are actually written and placed on the physical computer, defeating the intent of password secrecy.

The biometric quality of the MUT fingerprint ID system provides authentication much superior to computer pass codes. Unlike codes which can be hacked or taken by trick, such as phishing, the complex, elegant authentication enabled by the MUT fingerprint ID system is robustly secure. In contrast to previous fingerprint identification systems, the MUT fingerprint ID system has the capability of analyzing depth and pitch of fingerprint ridges in a clear topographical style map. Also, the ultrasound characteristics of normal dermis and epidermal layers are very difficult to reproduce in a forgery attempt. Thus, it would be highly difficult, if not impossible, to produce an effective fingerprint forgery for the MUT Fingerprint ID System.

As there are different levels of password complexity appropriate to the security level, graduations of fingerprint authentication allow greater flexibility of the system to the purpose. Partial fingerprint recognition, or resolution at a lower level than required for criminal law identification purposes, can be provided appropriately for many uses of the MUT fingerprint ID system.

Object Free eWallet

Besides computer use applications, during its initial introduction, the MUT Fingerprint ID System will replace pin codes and pass codes in coordination with physical objects, such as bank and credit cards. As broader adoption proceeds, the MUT Fingerprint ID System will eliminate the need for individuals to carry wallets or keys of any type.

In this later stage of the MUT fingerprint ID system adoption, bankcards, credit cards, drivers licenses, passports and other physical identification and access devices will be retained in a cloud computer form, and be accessed through the more secure biometric identification enabled by the MUT fingerprint ID system. Public transportation access cards will be replaced by a finger touch.

Object Free eKeys

The MUT fingerprint ID system provides, for the first time, the capability of truly keyless authorized entry. As the MUT fingerprint ID system is broadly adopted, entry to one's home and office, as well as entry and operation of one's car, will require no physical "key", as a finger touch will open this areas to the appropriate persons. This unique capability of the MUT fingerprint ID system is particularly advantageous in the case of a forgotten, misplaced or stolen wallet or keys.

The MUT fingerprint ID system eliminates the need of either traditional metal or electronic keys. The risk of loss or theft providing unauthorized entry inherent in currently available systems is dramatically reduced or eliminated. For convenience in inclement weather, either gloves providing decloaking of a fingertip, or thin, ultrasound transparency of a glove fingertip can be employed.

In one embodiment of the MUT fingerprint ID system, to gain entry, an authenticated individual touches an enabled key pad. During early adoption, the MUT fingerprint ID system will replace current electronic key pads, initially by retrofitting, and most secured building entry will be provided in this manner.

In later stages of adoption, entry of an individual into a locked area will be accomplished simply by grasping the MUT fingerprint ID system enabled door handle. In this embodiment, the MUT fingerprint ID system detection surface can be either embedded into the surface of a standard door handle, or covered with a thin layer of decorative metal similar to that of the body of the handle. However, the detection surface of the MUT fingerprint ID system is so robust to abrasion and weather challenges, an overlay of a thin metal veneer or paint would be provided only for the sake of appearance or preferred texture.

In the case of electronically activated doors, the authenticated individual may simply touch the door surface containing a MUT fingerprint ID system key pad to gain entry though electronic door opening activation. Authorization and entry are provided in a single movement, and do not require either a traditional metal key or electronic key.

The system automatically authenticates the individual when their hand grasps the entry handle, and by the time the handle is turned, the door is released and is opened. Entry is thus permitted in a single movement. For isolated or late night entry to a building, the reduction of time required for entry minimizes risk of criminal activity.

Once the authorized individual has entered a building, interior doors can be similarly enabled to allow entry. Thus, entry levels to different rooms within the building can be appropriately assigned. Tradespeople, by example, will have entry authorization to power rooms, cleaning people to utility rooms, and executives to specific offices and file rooms. Elevator access to specific floors can be similarly limited to authorized individuals, when they touch the appropriate elevator button for the correct floor access. Remote authentication can be provided as required.

Trusted Individual eKey Authorization

The MUT fingerprint ID system provides a previously unavailable level of access authentication for objects by selected individuals. In the case of internet enabled objects, entry to trusted individuals is provided remotely, with the option to designate discreet, specific, limited periods of time as enabled by the MUT fingerprint ID system.

In some cases, objects to be accessed need not be internet enabled. In this case, physical contact is necessary to provide the necessary direction to the entry feature. This will be the main application in the early stages of the MUT fingerprint ID system adoption However, internet enabled objects provide a much broader range of authorization capabilities through the MUT fingerprint ID system. By example, Tesla cars are internet enabled objects. Going forwards, internet enabled capability will be available in future models of more standard consumer cars.

Previously, efforts to have similar capabilities for car entry and operation, such as via a touch to a car door or grasp on a stick shift handle, have been attempted using visual fingerprint ID technologies. Due to their limitations as discussed previously, they have not enjoyed broad adoption.

In this embodiment, an access authorizer electronically receives e-fingerprints from trusted individual either directly or via internet transmission. The authorizer can than accept the trusted individual's fingerprint identification to receive access to an internet enabled object. The authorized fingerprint is transmitted to the internet enabled object remotely. The trusted individual is thus provided access at the appropriate level to the internet enabled object. Access can be both location and time limited.

By example, enabled by the MUT fingerprint ID system, a parent can provide access to the family car to a teenage offspring for a specific purpose. The authorization may be to allow chores to be completed during a specified period. A layered access can be provided, that is authentication to enter the car and authentication to start the ignition and drive the car. After the permitted time, the parent enabled access can be programmed to lapse. If needed, the offspring can e-request a time extension of the parent. Non-drivers or those who should not drive could be provided access to the trunk to retrieve personal items, without making the main cab available to them.

Similarly, the MUT fingerprint ID system can allow a property owner to provide specific tradespeople a time limited, person specific entry capability in order to complete repair or other tasks during an anticipated period. The preauthorized building entry time can be extended remotely if needed. Alternatively, a broader period for initial entry, with a set period for task completion and later lapse of entry capability, can be provided. If needed, access can be extended remotely. By example, a delivery person could be provided temporary access to the entry hall of a house to deposit a parcel in a safe manner.

Again, as there are different levels of password complexity appropriate to the security level, gradations of fingerprint authentication allow greater flexibility of the system to the purpose. Partial fingerprint recognition, at a lower level than required for criminal law identification, can be provided appropriately for many uses of the MUT fingerprint ID system.

Personal Safety Enhancement and Crime Deterrence

Theft of smartphones is now a major concern in cities, by example representing over half of thefts in San Francisco, Calif., USA. If these phones could only be used upon the correct fingerprint verification, these crime rates would be reduced by 50%. The MUT fingerprint ID system enabled smart phones are worthless to a thief, and will reduce crime rates substantially.

In child safety applications, doors to cleaning supplies, medications, and liquor/cigarette cabinets can be MUT fingerprint ID system enabled. In that way, young children are protected from access to dangerous substances, and their safety level improved. Through use of the MUT fingerprint ID system, underage family members will be denied access to family cigarettes and alcohol supplies.

The MUT fingerprint ID system can be included in the design of digital gun safes, such as First Alert 6742DF, Fire Resistant Executive Gun Safe, Homak Electronic Lock Pistol Box, and Elite Jr. Executive Fire Resistant Gun Safe, to provide appropriately limited access to firearms. As many firearm deaths are due to children accessing these weapons, the MUT fingerprint ID system will contribute to a lowering of these deaths. Additionally, the MUT fingerprint ID system components will provide greater safeguard against theft, with concomitant decrease of unregulated criminal use of unregistered firearms.

As firearms are designed as internet enabled objects, the safety aspect of the MUT fingerprint ID system to limit firearm accidents will be extended. Currently, the X system can be included to that end in digital trigger locks such as the catmedwid/10000LOCK by Rrarms, among others. As additional internet connectivity is provided to guns, such as the Tracking PointXactSystem Precision Guided Firearm, there will be more opportunities to limit unauthorized use of guns.

The MUT fingerprint ID system can be used as a fail-safe guard by detecting the identity of the user from a fingerprint on the trigger, locking down the gun from use. In a more traditional use, each gun can be provided a fingerprint file to identify the user of the gun during criminal activity, much as a "black box" is used to gain information after an airplane crash.

During periods when an entry door is in an open, unlocked state, the MUT fingerprint ID system can be used to alert the proper authorities and potential victims when an unauthorized person is entering a building. For example, in domestic violence situations, an abusive spouse under a court stay-away order can be identified entering a building from their touch on the door surface. An e-alert would then be transmitted to the potential victim and building security in order to notify them to the possible impending threat. The intruder's position can be tracked though the touch of interior doors. Similarly, in day care facilities, non-custodial family members can be identified at the door, with an e-alert to the possible threat of a child abduction signaled to care providers.

Enabled Personal Electronic Devices

There are multiple surfaces on personal electronic devices on which the MUT fingerprint ID system sensing surface can be incorporated. The cases of personal electronic devices are excellent locations for the MUT fingerprint ID system sensing surface. These otherwise underutilized external areas of personal electronic devices provide the surface availability key to installation of the MUT fingerprint ID system.

Unlike a camera port, touch keys, view screens, and other personal electronic interface components, the MUT fingerprint ID system touch pad surface is highly robust to abrasion, fluids, dirt, scratches, and can function effectively even through dirt film and other contaminates. Abrasion and scratches from normal use will have little or no effect on functionality. The structural integrity of the surface, and its tensile strength, will avoid compromise of the overall integrity of the device casing in which it is located.

To provide some level of protection to the MUT fingerprint ID system touch pad, in certain cases this surface may be slightly inwardly recessed from the casing's overall surface. In the case where the MUT fingerprint ID system surface is provided a thin esthetic over layer, to blend with the bulk of the casing material, this slight indentation will provide a cue to the user as to the location of the touch pad.

In many designs, the MUT fingerprint ID system verification will be accomplished simply by a user picking up the device. As such, the sensing surfaces are usefully located where the device would naturally be grasped for use. In some cases, this will be the surface the user would grasp to either open or hold the device.

In the case of personal electronic devices with metal exterior casings, such as currently with the iPad, iMac and other Apple products, the MUT fingerprint ID system can be installed on the surface, and the connectivity to the control chip accomplished through the electrically conductive case material. When hard plastic or other non-conductive case materials are employed in personal electronic device cases, a connection to the motherboard or internet enabling circuitry will be required, but can be easily accomplished with co-located surface device features.

Personal electronics represent a wide diversity of products. There are also crossovers between product types, such as tablets with cellphone capability, cell phones with large screens which serve as small tablets, Blackberry style capability in both cell phone and tablet formats, etc. Virtually all these products, both when combined in a single device, or when provided separately, will enjoy substantial increase in value and versatility when MUT fingerprint ID system is incorporated into their design.

The MUT fingerprint ID system can allow entry into multiple software capabilities and files without the current inconvenience of requiring the input and recalling multiple passwords, each with their own unique requirements for form and complexity. Instead, these systems would enjoy a much higher level of authentication without impeding legitimate user access to the systems. Currently, software viruses often de-encrypt the usual cumbersome access codes. Thus, both security and ease of use are enabled by the MUT fingerprint ID system.

The MUT fingerprint ID system will be usefully incorporated into standard cell phones. The MUT fingerprint ID system will also be an important feature when incorporated into a "smart phone". Because of MUT fingerprint ID system's small size, very low cost, and robust solid state construction, it is particularly advantageous for use in smart phones.

The cost of the MUT fingerprint ID system feature will be variable depending on the application and unit numbers. In some cases, where it is implemented with other device features, its cost will be negligible. In some cases, the cost per unit will be about $0.03 to $2 current US, specifically about $0.05 to $1 current US, and more specifically about $0.10 to $0.50 current US.

Cell Phones

Some examples of currently available, broadly used smart phones which could be improved by incorporating the MUT fingerprint ID system are BlackBerry Q10, BlackBerry Z10Sony Xperia Z, Samsung Galaxy Nexus, Samsung Galaxy S3, Samsung Galaxy Note 2, Samsung Galaxy S4, HTC First, HTC Windows Phone 8X, HTC Evo 4G LTE, HTC One X, HTC One X+, HTC Droid DNA; HTC OneApple iPhone 4S, iPhone 5, LG Optimus G, Nexus 4, Nokia Lumia 920, Motorola Droid Razr Maxx HD, among others.

Other smart phones which can be modified to include MUT fingerprint ID system are Acer Allegro, Acer beTouch E110, Acer beTouch E130, Acer beTouch E140, Acer DX900, Acer neoTouch, Acer X960, Adaptxt, Android Dev Phone, Baidu Yi, BenQ P30, BlackBerry Porsche Design P'9981, BlackBerry Torch, BlackBerry Torch 9800, BlackBerry Charm, BlackBerry Electron, BlackBerry OS, BlackBerry Pearl, BlackBerry Q10, BlackBerry Q5, BlackBerry Quark, BlackBerry Storm, BlackBerry Storm 2, BlackBerry Style, BlackBerry Tour, BlackBerry Z10, Carrier IQ, Casio G'zOne Commando, Celio Technology Corporation, Comparison of Android devices, Curzon Memories App, CyanogenMod, Dell Streak, Dell Venue Pro, Digital Ocean, Droid Charge, Droid Incredible, Droid Pro, Droid X, FairPhone, Neo 1973, Neo FreeRunner, Find My Phone, Fujitsu Toshiba IS12T, Galaxy Nexus, Garmin Nüvifone, GeeksPhoneKeon, GeeksPhone One, GeeksPhone Peak, Genwi, Google Experience device, Google Nexus, Greenphone, Hldroid, Helio Ocean, Hiptop Included Software, Hookflash, HP Veer, HTC 7 Mozart, HTC 7 Pro, HTC 7 Surround, HTC 7 Trophy, HTC Advantage X7500, HTC Butterfly S, HTC Desire, HTC Desire 600, HTC Desire HD, HTC Desire S, HTC Desire Z, HTC Dream, HTC Explorer, HTC HD7, HTC Hero, HTC Legend, HTC Magic, HTC One, HTC Radar, HTC Raider 4G, HTC Rhyme, HTC Sensation, HTC Sensation XL, HTC Smart, HTC Tattoo, HTC Titan, HTC Titan II, HTC Touch 3G, HTC Touch Viva, HTC Wildfire, HTC Wildfire S, HTC Windows Phone 8S, HTC Windows Phone 8X, Huawei IDEOS U8150, Huawei Sonic, Huawei STREAM X GLO7S, Huawei U8230, Huawei U8800, Huawei u8860, I-mate 810-F, IBM Notes Traveler, IBM Simon, Intel AZ210, 10S, IPhone, Iris 3000 Videophone, JavaFX Mobile, Jolla (mobile phone), Kyocera 6035, Kyocera Echo, Kyocera Zio, LG enV Touch, LG eXpo, LG GT540, LG GW620, LG Intuition, LG LU2300, LG Optimus 7, LG Optimus Chat, LG Optimus Chic, LG Optimus One, LG Optimus Vu, LG Quantum, LG VS740, LiMo Foundation, LiMo Platform, Mobilinux, MeeGo, Meizu M8, Meizu M9, Meizu MX, Micromax Canvas 2 A110, Micromax Canvas 2 Plus A110Q, Micromax Canvas HD A116, Micromax Ninja A89, Momentem, Motodext, Motorola A1000, Motorola A760, Motorola A780, Motorola A910, Motorola A925, Motorola Atrix 2, Motorola Atrix 4G, Motorola Backflip, Motorola Calgary, Motorola Defy, Motorola Devour, Motorola Flipout, Motorola i1, Motorola Milestone XT720, Motorola Ming, Motorola Photon, Motorola Photon Q, N-Gage QD, N100 (mobile phone), Nexus 4, Nexus One, Nexus S, Ninetology Black Pearl II, Ninetology Insight, Ninetology Outlook Pure, Ninetology Pearl Mini, Ninetology Stealth II, Nirvana Phone, Nokia 3230, Nokia 3250, Nokia 3600/3650, Nokia 500, Nokia 5230, Nokia 5250, Nokia 5500 Sport, Nokia 5530 XpressMusic, Nokia 5800 XpressMusic, Nokia 603, Nokia 6110 Navigator, Nokia 6210 Navigator, Nokia 6290, Nokia 6600, Nokia 6620, Nokia 6630, Nokia 6650 fold, Nokia 6670, Nokia 6680, Nokia 6700 slide, Nokia 6710 Navigator, Nokia 6760 Slide, Nokia 700, Nokia 701, Nokia 7610, Nokia 7650, Nokia 7700, Nokia 7710, Nokia 808 PureView, Nokia 9210 Communicator, Nokia 9300, Nokia 9500 Communicator, Nokia Asha 302, Nokia Asha 303, Nokia Asha 311, Nokia Asha 501, Nokia C5-00, Nokia C5-03, Nokia C6-01, Nokia C7-00, Nokia Communicator, Nokia E5-00, Nokia E50, Nokia E51, Nokia E52, Nokia E6, Nokia E60, Nokia E63, Nokia E65, Nokia E66, Nokia E7-00, Nokia E70, Nokia E72, Nokia E75, Nokia E90 Communicator, Nokia Lumia, Nokia Lumia 620, Nokia Lumia 800, Nokia Lumia 810, Nokia Lumia 820, Nokia Lumia 822, Nokia Lumia 900, Nokia Lumia 920, Nokia Lumia 925, Nokia N70, Nokia N71, Nokia N72, Nokia N73, Nokia N75, Nokia N76, Nokia N78, Nokia N79, Nokia N8, Nokia N80, Nokia N81, Nokia N82, Nokia N85, Nokia N86 8MP, Nokia N9, Nokia N90, Nokia N900, Nokia N91, Nokia N92, Nokia N93, Nokia N93i, Nokia N95, Nokia N950, Nokia N96, Nokia N97, Nokia X5, Nuvifone A50, O2 Xda, Ogo (handheld device), OpenEZX, Openmoko Linux, OPhone, Palm (PDA), Palm Centro, Palm Pixi, Palm Pre, Pantech Vega Racer, Pogo Mobile and nVoy, Samsung Ativ S, Samsung B7610, Samsung Behold II, Samsung Focus, Samsung Focus 2, Samsung Focus S, Samsung Galaxy, Samsung Galaxy Ace, Samsung Galaxy Ace Plus, Samsung Galaxy Core, Samsung Galaxy Fit, Samsung Galaxy Gio, Samsung Galaxy Mini, Samsung Galaxy Note, Samsung Galaxy Note II, Samsung Galaxy Note III, Samsung Galaxy Pocket, Samsung Galaxy Prevail, Samsung Galaxy S Duos, Samsung Galaxy Y DUOS, Samsung Galaxy Y Pro DUOS, Samsung GT-B7320, Samsung GT-B7330, Samsung i5500, Samsung i5700, Samsung i5800, Samsung i7500, Samsung i8000, Samsung i8910, Samsung Minikit, Samsung Omnia 7, Samsung Omnia W, Samsung Replenish, Samsung SGH-i300, Samsung SGH-i900, Samsung SPH-i300, Samsung SPH-i500, Samsung SPH-M810, Samsung SPH-M900, Samsung Wave 575, Shots On-Line, Siemens SX1, Siemens SX45, Smartphone, Smartphone addiction, Smartphone wars, Soft Input Panel, Sony Ericsson Live with Walkman, Sony Ericsson P1, Sony Ericsson P800, Sony Ericsson P900, Sony Ericsson P910, Sony Ericsson P990, Sony Ericsson Satio, Sony Ericsson Vivaz, Sony Ericsson Xperiaacro, Sony Ericsson Xperia Arc, Sony Ericsson Xperia arc S, Sony Ericsson Xperia mini, Sony Ericsson Xperia Mini Pro, Sony Ericsson Xperia neo, Sony Ericsson Xperia neo V, Sony Ericsson Xperia pro, Sony Xperia, Sony Xperia E, Sony Xperia M, Sony Xperia SP, Sony Xperia Z, Sony Xperia ZL, Spice MI-335 (Stellar Craze), Spice Stellar Nhance Mi-435, Super LCD, Symbian, T-Mobile myTouch 4G, T-Mobile myTouch 4G Slide, T-Mobile myTouch Q by LG and T-Mobile myTouch by LG, T-Mobile Pulse, Tizen, Treo 600, Treo 650, Treo 680, Treo 755p, Trium Mondo, Ubuntu Touch, UIQ, Vibo A688, Videophone, Videotelephony, Windows Mobile Smartphone, Windows Phone, Xiaomi MI-One, Xiaomi Phone 2, Xiaomi Phone 2S, Xplore G18, Xplore M98, and ZTE Tania, amoung others.

Electronic Tablets

The MUT fingerprint ID system has particular advantages as a new feature for electronic tablets. The MUT fingerprint ID system allows a user easy access without having to resort to typing in passcodes. Passcodes have limitations, such as when a user is on public transportation with considerable motion interfering with typing accuracy, or where the device needs to be quickly accessed through reentry multiple times. Also, the MUT fingerprint ID system enabled fingerprint verification of owner identity is an important factor in disincentivizing theft.

Examples of electronic tables which can usefully include MUT fingerprint ID system are: iPadApple A4, Apple A5, Apple A5X, Apple A6X and mini Apple A5, HP Slate 7 8G Tablet Samsung GALAXY NOTE 8.0, Samsung GALAXY NOTE 10.1 among many others.

The following examples are offered by way of illustration and not by way of limitation.

EXPERIMENTAL

The 1st order resonant mode of PMUT was obtained by some of the present inventors by finite element method (FEM) using commercial software (COMSOL).

Figure 8:
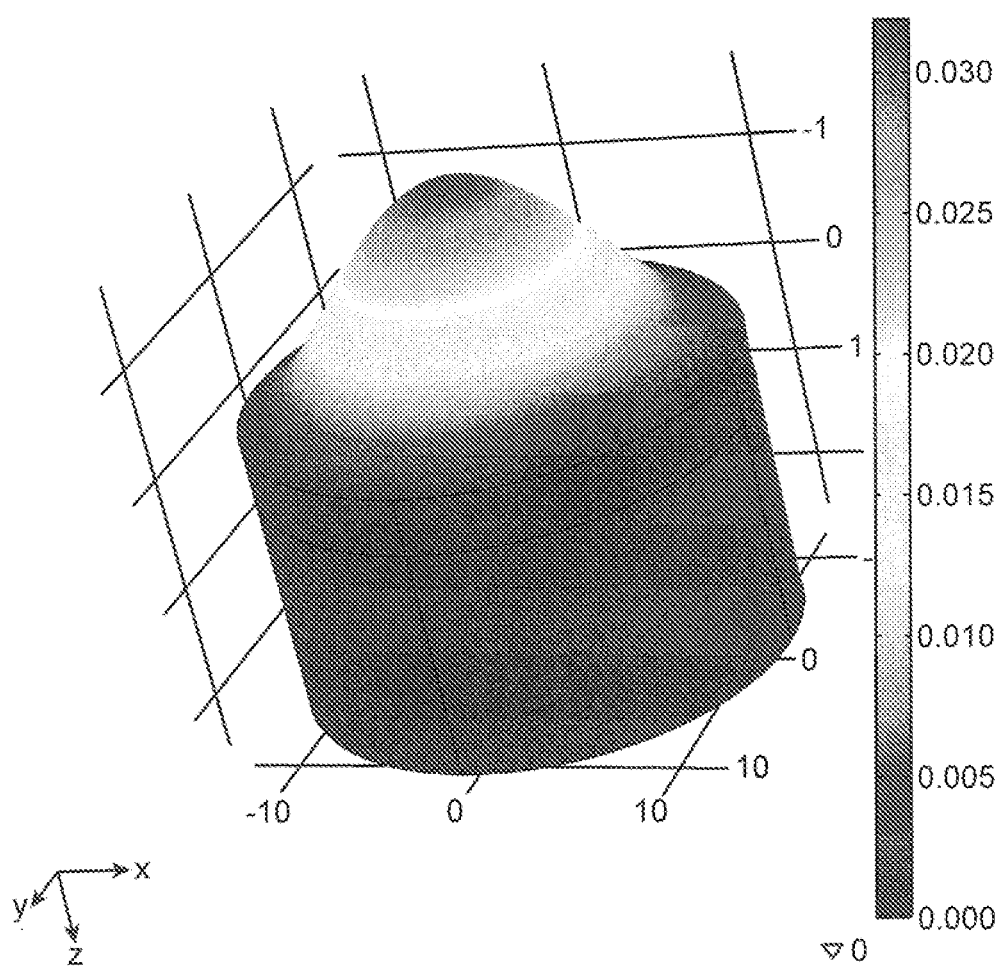
FIG. 8 shows the simulated vibration mode-shape of a single PMUT.

FIG. 8 shows the finite element analysis simulation of the vibration mode shape of a PMUT. As seen in FIG. 8 the resonant frequency of PMUT (with layer stack 0.5 μm AlN/2 μm Si and 25 μm diameter) in the air was about 64.8 MHz. The resonant frequency is proportional to membrane thickness and inversely proportional to membrane diameter squared.

Figure 9:
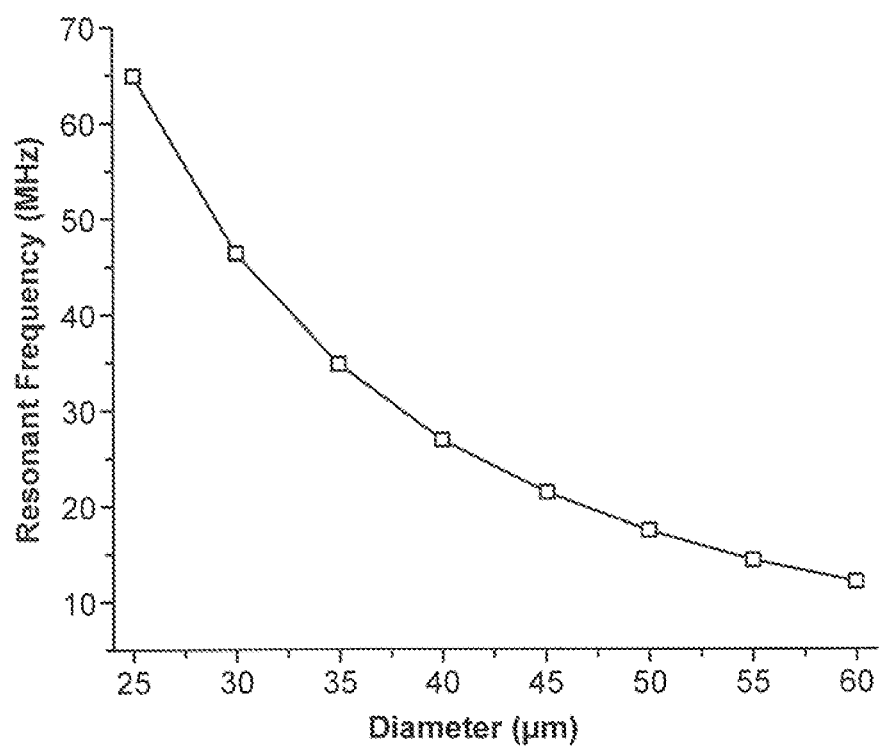
FIG. 9 shows the first resonant frequency of a PMUT as a function of diameter.

FIG. 9 shows the first resonant frequency of PMUTs as a function of diameter (layer stack 0.5 μm AlN/2 μm Si). Higher working frequency generates a smaller acoustic wavelength, resulting in a higher resolution fingerprint image.

Figure 10:
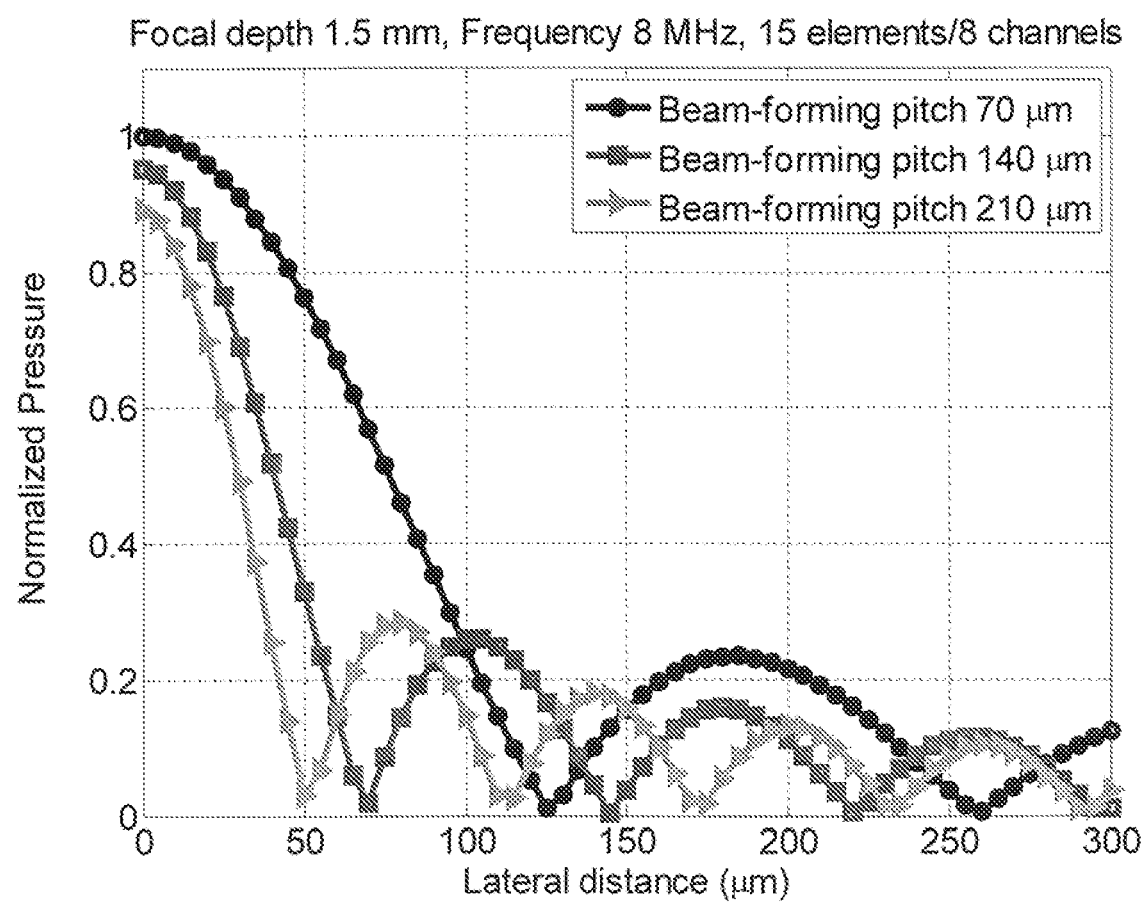
FIG. 10 shows the simulated acoustic beam pattern of PMUT arrays with different pitches.

FIG. 10 shows the simulated acoustic beam pattern of PMUT arrays having different pitches. Some of the present inventors use a phased array of transducers to achieve a highly directional, focused acoustic beam, as shown in this figure.

Figure 11:
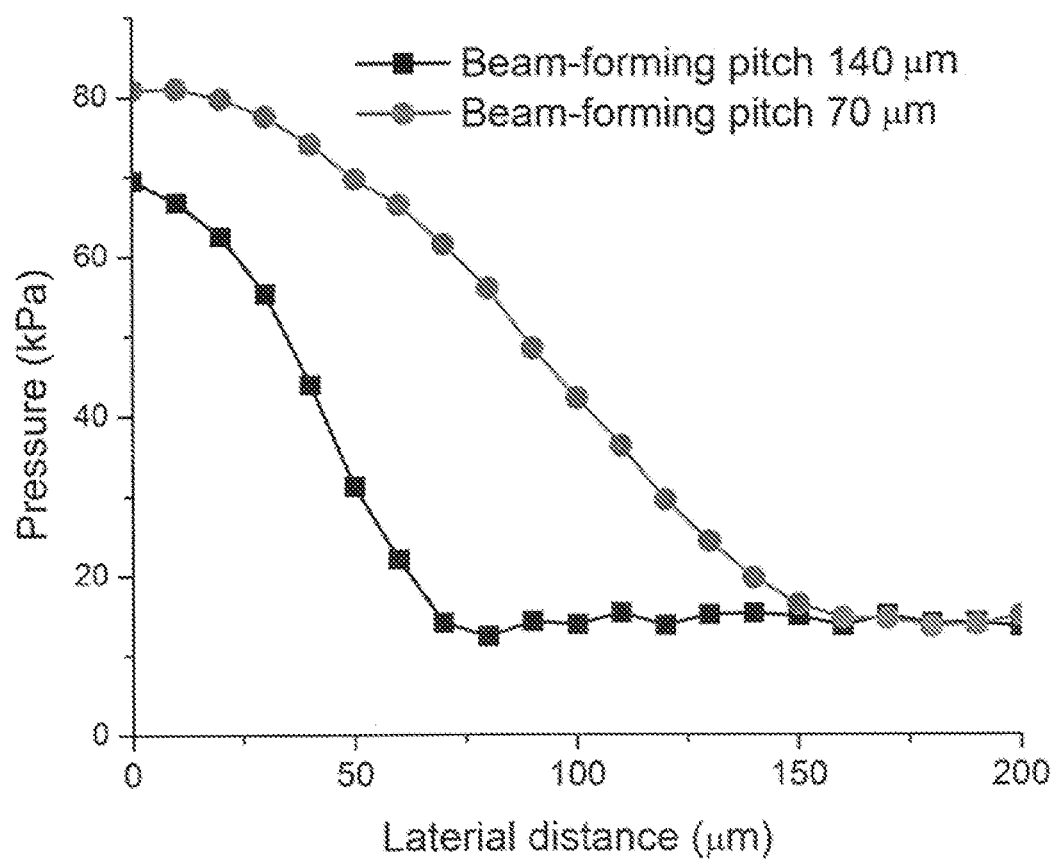
FIG. 11 shows the experimentally-measured acoustic beam pattern of PMUT arrays with different pitches.

FIG. 11 shows the experimentally measured pressure pattern from a 15-column PMUT array. The pressure was measured by scanning a 40 micron hydrophone across the array at a distance of approximately 1.5 mm from the array. Measurements were made driving every PMUT (70 micron pitch) and every other PMUT (140 micron pitch).

Figure 12:
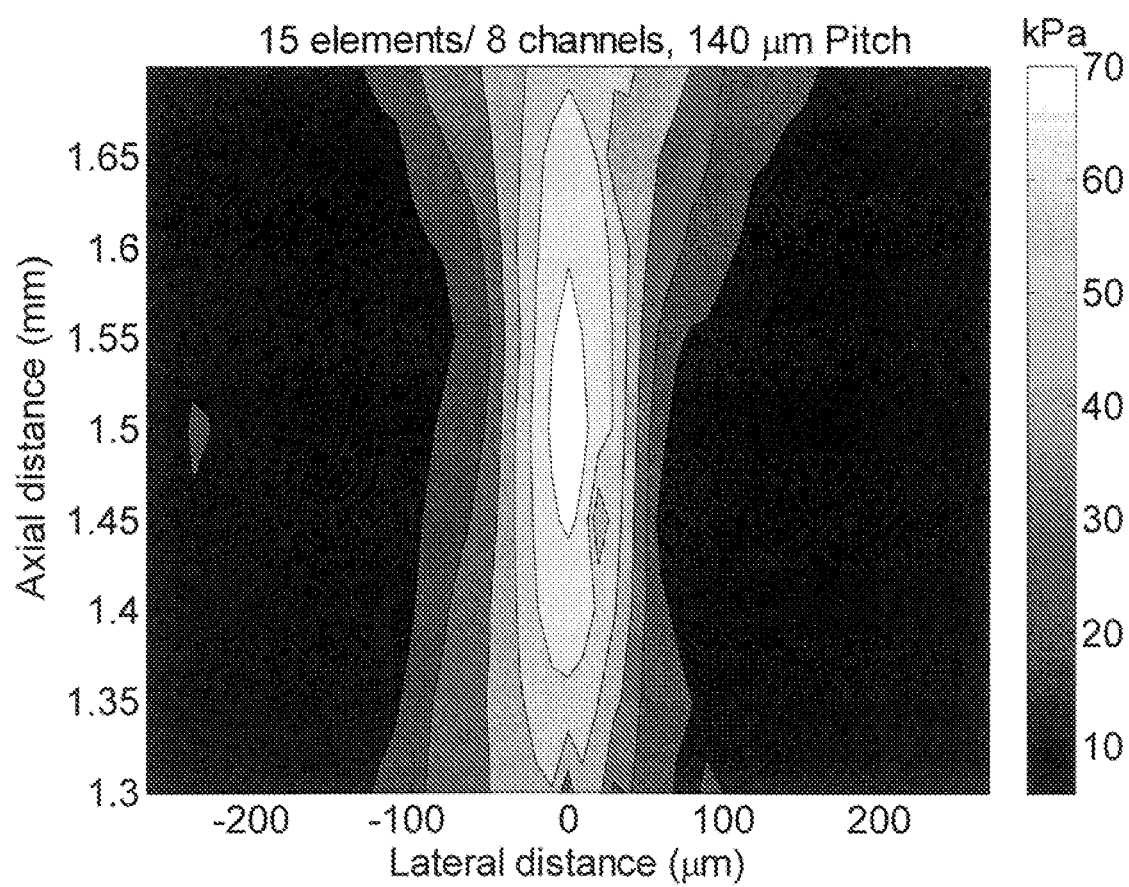
FIG. 12 shows the experimentally-measured acoustic beam pattern of a 15-column PMUT array with 140 micron pitch.

FIG. 12 shows the experimentally measured pressure pattern from a 15-column PMUT array. The pressure was measured by scanning a 40 micron hydrophone across the array in both the x and z (axial) directions. The PMUTs have a 140 micron pitch and beamforming is used wherein the phase of each column is controlled to produce a focused acoustic beam.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:

1. A MEMS ultrasound fingerprint ID system configured to detect both epidermis and dermis fingerprint patterns in three dimensions, the system comprising:
 a micromachined ultrasonic transducer (MUT) transmitter-receiver array comprising two or more MUT elements that apply an acoustic signal to a finger; and a data processor that receives and processes a signal from the array to produce an image of a fingerprint, wherein the system is configured to drive MUT elements in the MUT transmitter-receiver array in groups and scan the acoustic signal by switching excitation of the MUT elements from group to group in sequence, wherein a focus diameter of the acoustic signal is determined by a pitch between the MUT elements in the group and a frequency of the MUTs in the group, and wherein one or more of the MUT elements are periodically activated to detect whether the finger is present.

2. MEMS ultrasound fingerprint ID system of claim 1, wherein one MUT element is periodically activated to detect whether the finger is present.

3. The MEMS ultrasound fingerprint ID system of claim 1, wherein the system is configured to activate the one or more MUT elements about ten times per second.

4. The MEMS ultrasound fingerprint ID system of claim 1, wherein the system is configured to activate the MUT transmitter-receiver array upon detection of the finger by the one or more MUT elements.

5. A personal electric device comprising the MEMs ultrasound fingerprint ID system of claim 1.

6. The personal electric device of claim 5, wherein the MEMs ultrasound fingerprint ID system of claim 1 comprises an on switch for the device.

7. An internet enabled object comprising the MEMs ultrasound fingerprint ID system of claim 1.

8. The internet enabled object of claim 7, wherein the MEMs ultrasound fingerprint ID system comprises an on switch for the object.

9. An entry enablement device comprising the MEMs ultrasound fingerprint ID system of claim 1.

10. The entry enablement device of claim 9, wherein the MEMs ultrasound fingerprint ID system comprises an on switch for the device.

11. A MEMS ultrasound fingerprint ID system configured to detect both epidermis and dermis fingerprint patterns in three dimensions, the system comprising:

a micromachined ultrasonic transducer (MUT) transmitter-receiver array comprising two or more MUT elements that apply an acoustic signal to a finger; and a data processor that receives and processes a signal from the array to produce an image of a fingerprint, wherein the system is configured to drive MUT elements in the MUT transmitter-receiver array in groups and scan the acoustic signal by switching excitation of the MUT elements from group to group in sequence, wherein a focus diameter of the acoustic signal is determined by a pitch between the MUT elements in the group and a frequency of the MUT elements in the group, wherein the data processor processes the signal from the array based on a time of flight of an echo from the applied acoustic signal, and wherein the data processor uses time gating to identify echoes from the array.

12. The MEMS ultrasound fingerprint ID system of claim 11, wherein the data processor uses time gating to identify echoes corresponding to the epidermis.

13. The MEMS ultrasound fingerprint ID system of claim 11, wherein the data processor uses time gating to identify echoes corresponding to the dermis.

14. The MEMS ultrasound fingerprint ID system of claim 11, wherein the data processor produces an image of a fingerprint by fusing an image of the epidermis with an image of the dermis.

* * * * *